United States Patent Office — 3,523,936, Patented Aug. 11, 1970

3,523,936
2 - SULFONAMIDO - 4 - (N,N - DISUBSTITUTED AMINO)BENZENEAZO - 1,4 - NAPHTHALENE- OR 1,4-BENZENE-AZOBENZENE DYES
Masuo Toji, Bellmawr, N.J., assignor to E. I. du Pont de Nemours and Company, Wilmington, Del., a corporation of Delaware
No Drawing. Filed Jan. 31, 1967, Ser. No. 612,832
Int. Cl. C09b 31/02, 31/04
U.S. Cl. 260—187                  9 Claims

ABSTRACT OF THE DISCLOSURE

2 - sulfonamido - 4 - (N,N-disubstituted amino)benzeneazo - 1,4 - naphthalene(or 1,4 - benzene)azobenzene dyes, for example,

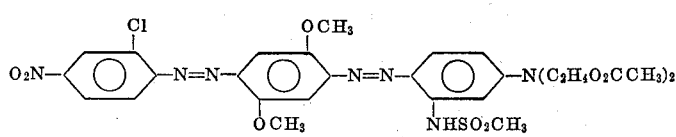

having superior light-, sublimation-, ozone- and washfastness properties, and useful for dyeing polyester fibers and polyester fiber blends which thereafter can be subjected to a permanent press resin treatment.

BACKGROUND OF THE INVENTION

Field of the invention

The dye trade is continuously seeking new and better dyes for use in existing dyeing systems, newly developed systems and with different fibers, blends and materials composed of said fibers, which materials may, for example, be subjected to an after-treatment (after dyeing) step, such as the application of a permanent press resin composition, to impart an additional desirable property to the dyed fiber.

The dyes of this invention provide dyed polyester and polyester-blend fibers having significantly desirable light-, ozone-, sublimation and washfastness properties, both before and after any optional after-treatment step such as the application of a permanent press resin composition.

Description of the prior art

U.S. 2,289,413 describes dyes particularly for obtaining navy blue to black shades which have very good fastness properties, primarily on cellulose esters or ethers. Moreover, many of the shades are reported to be readily discharged, for example, by means of zinc formaldehyde sulphoxylate. The dyes of the subject patent are characterized by containing at least two azo groups and having a residue of a monoacidyl m-phenylene diamine as an end component.

U.S. 2,044,082 relates to disazo dyes especially adapted for dyeing cellulose esters and ethers. Objects of the invention are to produce dyes which impart shades of satisfactory fastness to light and washing to textile materials. The dyes range from brown through red to reddish-violet on cellulose derivatives. These objects are attained by coupling a diazotized amine of the benzene or naphthalene series with a dialkoxy aniline, diazotizing the resulting aminoazo compound and coupling it with an amine of the benzene series, the amino group of which has substituted thereon at least one beta-hydroxy-alkyl group.

U.S. 2,606,898 relates to azo dyestuffs suitable for the dyeing of cellulose acetate or other organic derivative of cellulose textile materials in desirable blue shades fast to light and to acid fading. It also discloses blue shades which are dischargeable to a clear, white color. The dyes are prepared by diazotizing a monoazo dye base and coupling the diazotized compound with a developer.

U.S. 2,357,317 discloses azo compounds having the general formula

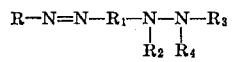

wherein R=a benzene nucleus, an azobenzene nucleus and a naphthalene nucleus; $R_1$=a benzene or naphthalene nucleus; $R_2$, $R_3$ and $R_4$=H, alkyl groups or hydroxyalkyl groups. Example 11 would yield the following disazo rubine dye:

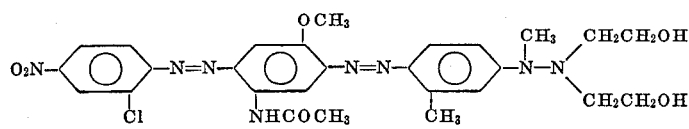

U.S. 2,737,700 discloses, in Example 9, the diazotization of

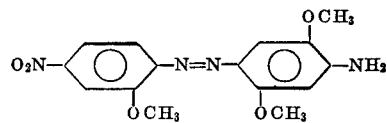

and coupling to

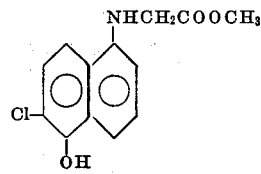

to yield a dye which colors cellulose acetate silk blue.

SUMMARY OF THE INVENTION

The present invention is directed to disazo dyes of the generic structure:

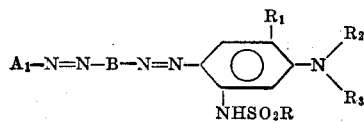

wherein:

$A_1$=a benzene ring which may be optionally substituted with up to three substiuents selected from nitro, halogen, cyano, lower alkyl, lower alkoxy, trifluoromethyl, alkylsulfonyl, acetyl, N-alkyl carboxamido, and carbalkoxyl groups;

B is selected from (1) a 1,4-naphthalene group and (2) from a 1,4-phenylene group of the following structure:

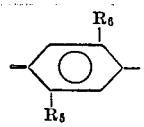

wherein $R_6$ may be H, lower alkyl or lower alkoxy;
$R_5$ may be $R_6$, halogen, or methanesulfonamido;
R=an alkyl group having 1-4 carbon atoms or

where M may be lower alkyl, lower alkoxy, or halogen;
$R_1$=H, lower alkyl or lower alkoxy;

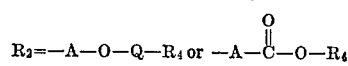

wherein
A=an alkylene group having 1-4 carbon atoms,

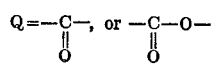

$R_4$=an alkyl group of 1-4 carbon atoms;
$R_3=R_2$, cyanoethyl, or alkoxyalkyl groups.
Included are novel disazo dyes having the following sub-generic structure:

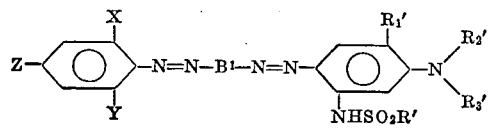

wherein:

X, Y and Z are substituents selected from the group including hydrogen, nitro, chloro, bromo, cyano, and trifluoromethyl;
B' is chosen from

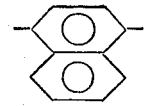

or

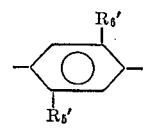

wherein $R_5'$ and $R_6'$ may be hydrogen, lower alkyl or lower alkoxy;
R is selected from the group lower alkyl and

wherein M' may be lower alkyl, lower alkoxy, and chlorine;
$R_1'$=hydrogen or lower alkoxy;

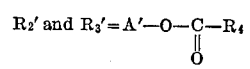

wherein
A'=an alkylene group of 2-3 carbon atoms;
$R_4$=lower alkyl group as earlier defined.

Preferred novel dyes of this invention within the preceding generic structure include:

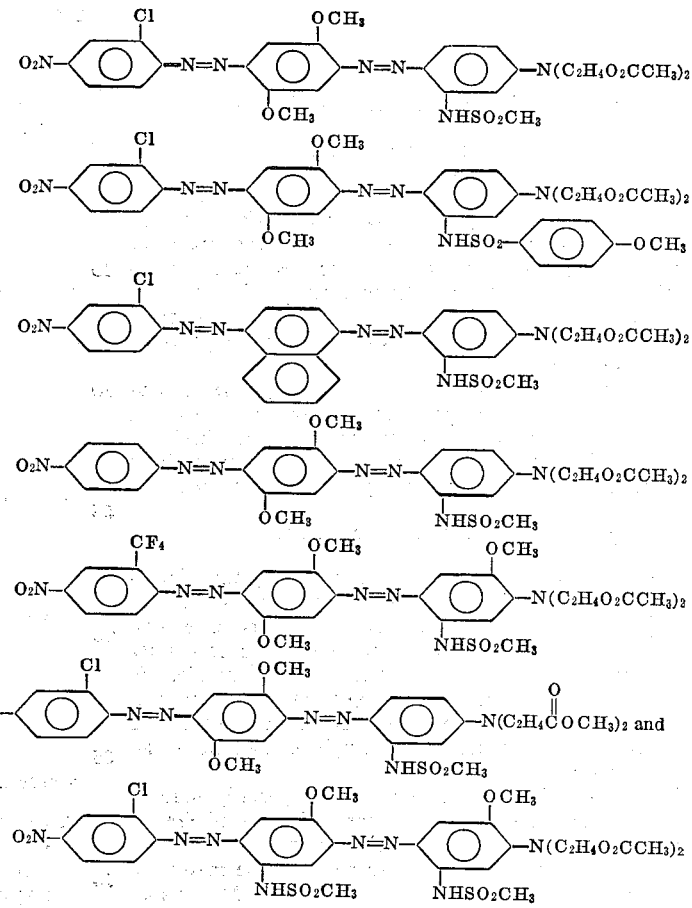

As stated heretofore, the present invention also encompasses polyester fibers and blends of polyester fibers dyed with an invention dye as herein described and claimed.

The dyes of this invention as heretofore defined generically, may be prepared by diazotizing the compound $A_1-N=N-B-(p)-NH_2$, wherein $A_1$ and B may contain the substituents as defined, by conventional means in aqueous-organic acid and coupling -para to the substituted amino group ortho to the sulfonamido group- with a compound of the formula:

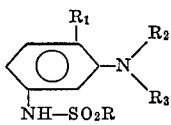

wherein R, $R_1$, $R_2$, and $R_3$ are as designated. Also, certain of those dyes heretofore sub-generically defined may be prepared by diazotizing the compound

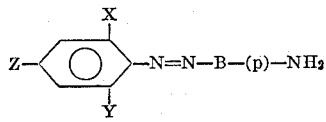

wherein X, Y, Z and B' are as defined above, preferably by conventional means in aqueous organic acid, and coupling -para to the substituted amino, ortho to the sulfonamido- with a compound of the formula

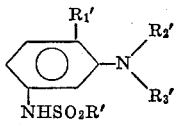

wherein R', $R_1'$, $R_2'$, and $R_3'$ are as specified.

The following disclosure illustrates the simple, economical process for preparing the novel dyes of this invention and their utility.

Synthesis of the monoazo intermediate

Many of the monoazo intermediates used in preparation of the dyes of this invention have been described previously in U.S. 2,289,413; a representative preparation is presented here.

2-chloro-4-nitroaniline may be diazotized in dilute, aqueous hydrochloric acid by conventional means and coupled with 2,5-dimethoxyaniline. The resulting monoazo intermediate is formed initially as the hydrochloride; neutralization with caustic affords the free base (I) which is isolated by filtration.

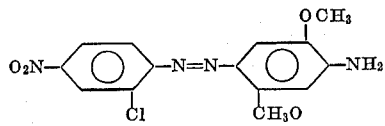

Diazotization of the monoazo intermediate

Diazotization of the monoazo intermediate is unique. As described in U.S. 2,289,413, nitrosylsulfuric acid had to be used to effect diazotization of their monoazo intermediates. Unexpectedly, it has now been found that the monoazo intermediates of this invention can be readily diazotized in a mixture of water, acetic acid, and hydrochloric acid with sodium nitrite. This method of diazotization is a distinct improvement over the prior art in that it is more economical and effective and results in less complications during the final coupling and subsequent isolation of the dye.

The monoazo intermediate (I) is diazotized in water-acetic acid medium (5 to 1 ratio) and coupled with m-methane-sulfonamidophenyldiethanolamine diacetate to yield structure II.

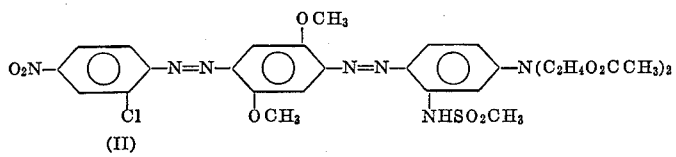

The precipitated dyestuff (II) is isolated by filtration and washed thoroughly with water. The wet, crude dyestuff is finely dispersed (by viscous milling) using sodium lignosulfonate or partially desulfonated sodium lignosulfonate as the dispersant to yield an aqueous dispersion suitable for dyeing polyester fibers by a padding/dry heat (e.g. Thermosol) treatment.

Alternate synthesis

In the preceding illustration of the general method of synthesis for the dyes of this invention, the intermediate monoazo was isolated, then re-diazotized and coupled to the final coupler to yield the disazo products. Alternatively, it has also been found that the intermediate monoazo compound need not be isolated. Following preparation of the amino-azo compound, acetic acid, and sodium nitrite may be added to yield the monazodiazo, which may then be coupled with, for example, m-methanesulfonamidophenyldiethanolamine diacetate. This, of course, represents a step-saving advantage in dye manufacture.

In preparing an intermediate monoazo compound, as illustrated by compound I, the following anilines may be substituted for 2-chloro-4-nitroaniline: aniline, 4-nitroaniline, 4-cyanoaniline, 4-nitro-2-cyanoaniline, 3-chloro-4-cyanoaniline, 2-cyano-5-chloroaniline, 2,6-dichloro-4-nitroaniline, 2-chloro - 4 - cyanoaniline, 4-aminophenylmethylsulfone, 4-aminoacetophenone, 2-amino - 5 - nitrotoluene, 2-amino-5-nitroanisole, 3-nitro-4-aminotoluene, 2,4-dichloroaniline, 2-trifluoromethyl - 4 - chloroaniline, 3-chloro-4-amino-1-trifluoromethylbenzene, 2,4-dinitro-6-bromoaniline, 2-cyano - 4,6 - dinitroaniline, 2-cyano-6-bromo-4-nitroaniline, 2-cyano-5-chloro-4-nitroaniline, 2-methoxy - 4 - nitroaniline, 2-amino - 5 - nitrobenzoic acid methyl ester, 3-nitro-4-aminobenzoic acid butyl ester, 4-aminobenzoic acid methyl ester, 4-aminobenzoic acid alkylamides such as -methyl or -dimethylamide, 2-trifluoromethyl-4-nitroaniline and 2 - amino - 3,5 - dinitrobenzotrifluoride. The preceding anilines are known compounds cited, for example, in U.S. 3,268,507, U.S. 2,257,788, and U.S. 3,097,198.

Coupling components, useful in obtaining intermediate monoazo compounds similar to I, include the following alternatives to 2,5-dimethoxyaniline: aniline, o- and m-toluidine, o- and m-anisidine, p-xylidine, 2,5-diethoxyaniline, monoacetyl-m-phenylenediamine, 4-acetylamino-2-aminotoluene, monobenzoyl - m - phenylene diamine, α-naphthylamine, 2-amino-4-acetylaminoanisole, 2-amino-4-methylanisole, m-chloroaniline, m-bromoaniline, monomethanesulfonylphenylene diamine. The preceding anilines, except for the last one, are known compounds cited, for example, in U.S. 2,289,413. The preparation of the latter compound is given in Example 12.

In preparing the illustrative disazo dye II, 3-methanesulfonylamino-N,N-di(β-acetoxyethyl)aniline was used as the final coupler; this compound was disclosed in British 852,396, Example 12. This coupler is prepared by dissolving m-aminophenyldiethanolamine diacetate in pyridine and adding methanesulfonyl chloride at 25° C.

By substituting arylsulfonyl chlorides for the methanesulfonyl chloride, arylsulfonamides may be readily obtained.

Alternate final couplers may also be employed. For example, the couplers disclosed in U.S. 3,268,507 of general structure

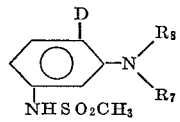

wherein D may be hydrogen or lower alkoxy; $R_7$ is $$-W-O-\underset{\underset{O}{\parallel}}{C}-O-R_9$$

wherein W is a lower alkylene having 2–4 carbon atoms; $R_9$ is a lower alkyl; $R_8$ may be either cyano lower alkyl or $$-W-O-\underset{\underset{O}{\parallel}}{C}-O-R_9$$

Additional alternative final couplers, which may be used, have been disclosed in French 1,350,486 and are of the following general structure:

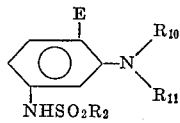

wherein E is hydrogen or alkoxy, $R_{10}$ is $-C_nH_{2n}COOR_{13}$, $-C_nH_{2n}CN$, or $-C_nH_{2n}OOCR_{13}$, $n$ is an integer from 1—4, $R_{11}$ is $-C_nH_{2n}COOR_{13}$ or $-C_nH_{2n}CN$, $R_{12}$ and $R_{13}$ are lower alkyl.

The dyes of the present invention have, for example, significant utility for polyester fibers and their blends, which fibers are subjected to the now popular permanent-press-finish treatment.

As currently practiced, the deferred cure durable press process consists of the following steps:

(a) a polyester or polyester-cotton blend fabric is dyed;
(b) durable press finishing agents are applied;
(c) fabric is cut and made to into garments;
(d) garments are pressed and finally cured.

A typical press finish formulation is described by V. Salvin, "The Effect of Dry Heat on Disperse Dyes," pp. 48–59, American Dyestuff Reporter, June 20, 1966.

A dyer faces many problems resulting from the deferred curing operation. To be acceptable, the dyes used must exhibit a minimum degree of bloom and solvent bleed, and maintain a maximum degree of wash-, ozone-, sublimation, gas-fume-, and lightfastness.

During the curing operation (300–350° F. for 15 to 18 minutes), (d) above, a disperse polyester dye may migrate from the polyester fiber into the softening and wetting agents, become concentrated on the surface of the fiber, manifesting itself as a deepening of shade and often as a shade change. Moreover, the extracted dye generally exhibits poor fastness properties, especially when compared to its fastness on conventionally dyed polyester fiber. Light-, ozone-, and washfastness are particularly deleteriously affected. In fact, as pointed out by V. Salvin in the article previously referred to, there are no commercially available blue dyes which exhibit good ozone-fastness after a durable press finish.

The Thermosol method of dyeing polyester-cotton blends, described in U.S. 2,663,612, allows a dyer to rapidly and economically produce the high volume of fabric now being used for durable press finished garments. The Thermosol method requires dyes with a high diffusion rate and good solubility in polyester fibers in order to fully utilize the dye, and to obtain level and reproducible dyeings. Thus, a difficult problem arises for if a dye has a high diffusion rate as required for Thermosol dyeing, then the dye will be easily extracted into the finishing agents during the durable press finish curing operation.

Perhaps it should be noted at this point that the need for scouring the unfixed dye arises particularly if the polyester is dyed by the Thermosol method; scourability is not as critical when the polyester fiber is dyed by conventional aqueous or carrier methods. In Thermosol dyeing, a fine, aqueous dye dispersion is padded onto a polyester-cotton blend. After evaporation of the water, which leaves small dye particles on the surface of the blend fabric, the dye is fixed by heating briefly (60–90 sec.) to 400–430° F. This dry heat fixation leaves some residual dye mechanically adhering to the surface of the fabric. If the dye diffusion rate is slow, as required for fabrics to be finished with durable press resins, then undesirably large amounts of unfixed dye will remain adhered to the fabric surface, which must be removed by a scour. On the other hand, if the blend is dyed by an aqueous or carrier method, the dye is in equilibrium between suspended dye, dye dissolved in water, and dye dissolved (fixed) in the polyester fiber. At the end of the dyeing period, the unfixed dye remains suspended or dissolved in water, is not mechanically held appreciably on the fabric surface as with Thermosol dyeing.

Thus, for Thermosol-dyed, polyester-cotton blends, which are to be subsequently durable press finished, dyes must be utilized which have the following three characteristics, in addition to the usual fastness requirements:

(1) A high diffusion rate in polyester fibers at the Thermosol dyeing temperature (400–430° F.);

(2) The unfixed, residual dye on the blend fabric surface must be easily scoured clean;

(3) A low diffusion rate in polyester fibers at the durable press curing temperature (300–350° F.) and high solubility in polyester fibers.

Representative examples further illustrating the present invention follow:

EXAMPLE 1

Synthesis of 2'-chloro-4'-nitro-2,5-dimethoxy-4-aminoazobenzene

A diazo was prepared from 51.7 g. of 2-chloro-4-nitroaniline, 75.0 ml. of conc. hydrochloric acid, 63.0 ml. of 5 N sodium nitrite solution, and 200 ml. of water in a standard manner. The diazo solution was added in portions to a solution of 43.1 g. of 2,5-dimethoxyaniline dissolved in 26.0 ml. of conc. hydrochloric acid and 600 ml. of water at 0–5° C. The mixture was neutralized to pH 7 with a 30% caustic soda solution. The dark colored product was collected on a filter and washed with 2 liters of hot water. The cake was dried to yield 96 g. of the intermediate [$\lambda_{max}$ 543 M$\mu$(DMF), $\epsilon_{max}$ 33,100 l./mole/cm.] 2'-chloro-4'-nitro-2,5-dimethoxy-4-aminobenzene.

The crude dye intermediate was recrystallized from hot ethanol to yield a solid melting at 211–217° C. [$\lambda_{max}$ 543 m$\mu$(DMF), $\epsilon_{max}$ 34,100 l./mol./cm.].

Analysis.—Calcd. for $C_{14}H_{12}N_4ClO_4$ (percent): C, 49.93; H, 3.89; N, 16.64; Cl, 10.53. Found (percent): C, 50.9; H, 4.2; N, 16.2; Cl, 10.2.

Diazotization of 2'-chloro-4'-nitro-2,5-dimethoxy-4-aminoazobenzene

A smooth, uniform, slurry is prepared from 33.7 g. (0.10 mole, 203 g. of a 17% wet cake) of 2'-chloro-4'-nitro-2,5-dimethoxy-4-aminoazobenzene, 200 ml. of water, 100 ml. of acetic acid, and 37.5 ml. (0.45 mole) of conc. hydrochloric acid. The diazotization will proceed more efficiently if from 50 to 100 parts of acetic acid per 0.10 mole of coupler is used. 5 N sodium nitrite (35 ml., 0.175 mole) is added at 18 to 30° C. over a 30–60 min. period. The preferred temperature for the diazotization is from 20–25° C. After the sodium nitrite has been added, the clear, dark red solution is agitated for 45 min. The excess sodium nitrite is then destroyed with sulfamic acid. Charcoal and a filter aid (2 g. each) are added and the mixture is filtered.

Coupling to yield disazo dye

The coupling solution was prepared by dissolving 28.0 g. (0.10 mole) of N,N-bis(2-acetoxyethyl)-metaphenylene-diamine in 100 ml. of pyridine. Methanesulfonyl chloride (8.65 ml., 0.11 mole) was added at 25° C. over a 30 minute period. The solution was stirred at 25° C. for one hour and then washed into a beaker with 200 ml. of acetic acid. The coupling solution was cooled at 0–5° C. The diazo solution was added to the coupling solution at 0–5° C. over a period of one hour. The mixture was then stirred at ambient temperature overnight. The mixture was filtered and the cake was washed with 1 liter of water. The dark solid was then dried. The dried solid was recrystallized from 200 ml. of dimethylformamide and 50 ml. of water to give a dark solid (44 g.) melting at 189–192° C. of structure

Alternate synthesis of disazo dye of Example 1

A diazo was prepared from 39.7 g. (0.23 mole) of 2-chloro-4-nitroaniline, 300 ml. of water, 57.5 ml. (0.69 mole) of conc. hydrochloric acid and 50 ml. of 5 N sodium nitrite solution. The diazo was added in small portions to a solution of 30.6 g. (0.20 mole) of 2,5-dimethoxyaniline dissolved in 19.2 ml. (0.23 mole) of conc. hydrochloric acid and 400 ml. of water at 5–10° C. until a negative test for coupler and diazo was obtained. The thick orange colored reaction mixture was stirred for two hours at 15–20° C. Acetic acid, 200 ml., was added and the temperature was adjusted at 25° C. Five N sodium nitrite (60.0 ml., 0.30 mole) was added dropwise over a 30 minute period. The dark red solution was stirred for 30 min. at 25° C. The excess sodium nitrite was destroyed with sulfamic acid. Charcoal and a filter aid (2 g. each) were

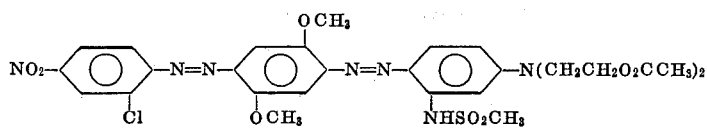

*Analysis.*—Calcd. for $C_{29}H_{32}N_7ClSO_{10}$ (percent): C, 49.33; H, 4.57; N, 13.89; S, 4.54; Cl, 5.02. Found (percent): C, 49.8 and 49.9; H, 4.8 and 4.2; N, 13.5 and 13.2; S, 3.9 and 3.9; Cl, 4.9 and 5.1.

Dispersing the disazo dye

In a typical colloid or sand mill, 20 g. of the above crude disazo dye and 3 g. of a highly purified partially desulfonated sodium lignosulfonate were milled to yield a dispersion with a particle size of one micron or less. The addition of 5 g. more of a highly purified partially desulfonated sodium lignosulfonate and 5 g. of sorbitol is made to insure paste (dispersion) stabilization. This paste is used to dye polyester/cotton blend fabrics to yield a navy blue shade with excellent fastness to light, sublimation, ozone and washing.

added and the solution was filtered. The filtrate (diazo) was added to a solution of 71.6 g. (0.20 mole) of N'-methanesulfonyl-N,N-bis (2-acetoxyethyl)metaphenylenediamine dissolved in 150 ml. of acetic acid at 25° C. over a 45 min. period. After adding the diazo, a solution of 20.0 g. (0.50 mole) of sodium hydroxide dissolved in 60 ml. of water was added dropwise. The dark reaction mixture was stirred for 3 hours. The precipitated dye was collected on a filter, washed with 4 liters of hot water and then dried. The dye (109 g.) was obtained in 77% yield.

A paste of this crude disazo dye, when prepared and dyed according to Example 1, gave very similar dye test results compared to Example 1.

The following specific dyes of the present invention are prepared by the procedure of Examples 1 and 2 by making the appropriate molar substitutions for initial diazo intermediate coupler and final coupler.

| Structure | Shade |
|---|---|
| $CH_3O_2S$—⟨O⟩—N=N—⟨O⟩(OCH₃)(OCH₃)—N=N—⟨O⟩(NHSO₂CH₃)—N(C₂H₄O₂CC₂H₅)₂ | Violet. |
| $CH_3$—CO—⟨O⟩—N=N—⟨O⟩(OCH₃)(OCH₃)—N=N—⟨O⟩(OCH₃)(NHSO₂C₂H₅)—N(C₂H₄O₂CC₃H₇)₂ | Do. |
| $O_2N$—⟨O⟩(CH₃)—N=N—⟨O⟩(OCH₃)(NHSO₂CH₃)—N=N—⟨O⟩(NHSO₂C₃H₇)—N(C₂H₄O₂CC₄H₉)₂ | Do. |
| $O_2N$—⟨O⟩(OCH₃)—N=N—⟨O⟩(OCH₃)(CH₃)—N=N—⟨O⟩(OCH₃)(NHSO₂C₄H₉)—N(C₂H₄O₂CCH₃)₂ | Do. |
| Cl—⟨O⟩(Cl)—N=N—⟨O⟩(OCH₃)(OCH₃)—N=N—⟨O⟩(NHSO₂CH₃)—N(C₂H₄O₂CCH₃)₂ | Red. |
| Cl—⟨O⟩(CF₃)—N=N—⟨O⟩(OCH₃)(OCH₃)—N=N—⟨O⟩(NHSO₂CH₃)—N(C₂H₄O₂CCH₃)₂ | Rubine. |

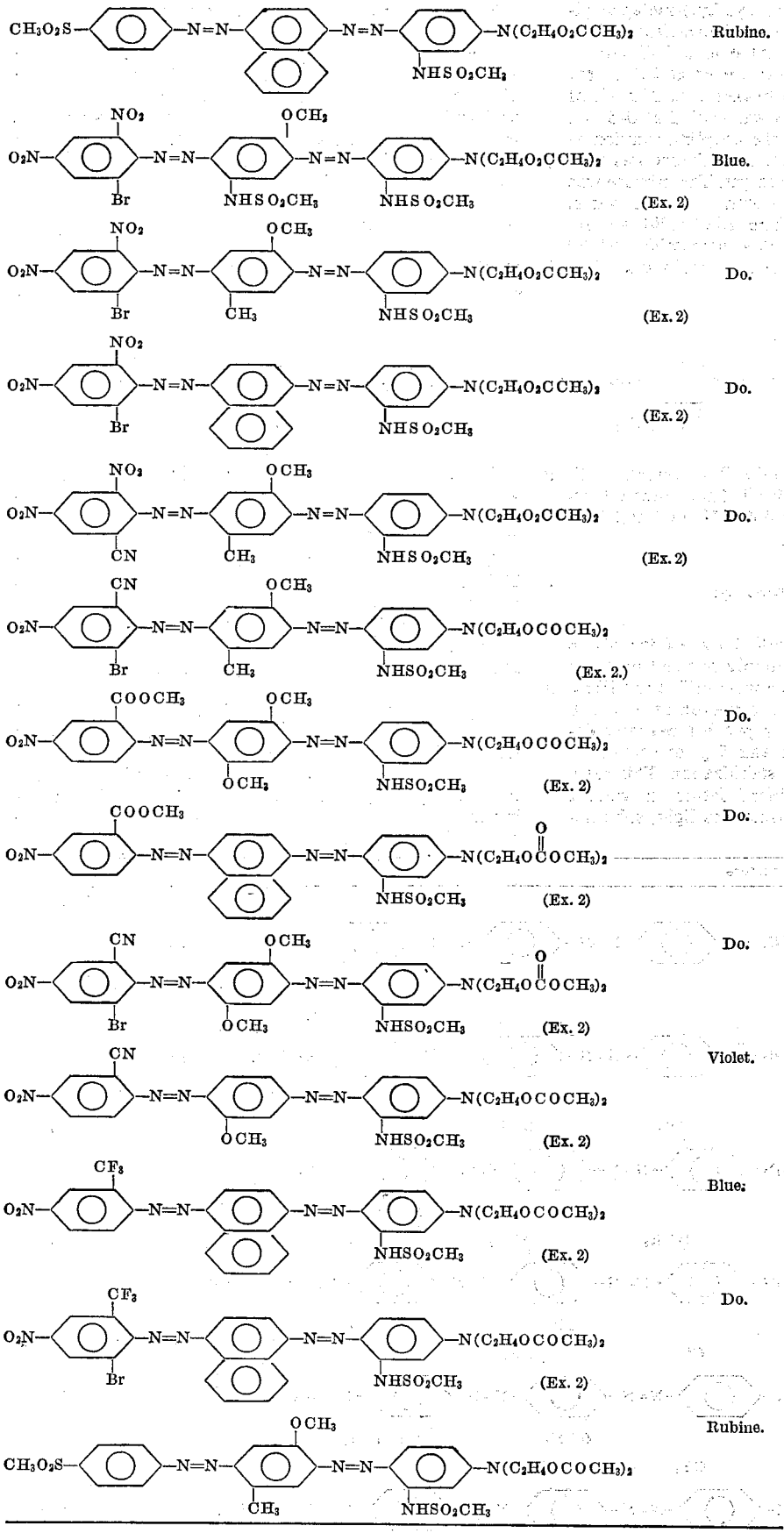

EXAMPLE 2

A smooth slurry was prepared from 37.2 g. (0.10 mole) of 2′,6′ - dichloro-4′-nitro-2,5-dimethoxy-4-aminoazobenzene, 150 ml. of acetic acid and 150 ml. of water. Conc. hydrochloric acid (25.0 ml., 0.30 mole) and 200 ml. of water were added and the mixture was slurried again to a smooth paste. The temperature was adjusted to 30° C. and then 30 ml. (0.15 mole) of 5 N sodium nitrite was added over a 30 min. period. The solution was stirred for 30 min. and then the excess nitrite was destroyed with sulfamic acid. Supercel and charcoal (4 g. each) were added and the mixture was filtered. The coupling solution was prepared by dissolving 28.0 g. (0.10 mole) of N,N-bis(2-acetoxyethyl)metaphenylenediamine in 50 ml. of pyridine; 9.0 ml. (0.11 mole) of methanesulfonyl chloride was added at 15–20° C. over a 15 min. period. The deep red solution was stirred for one hour at 15–20° C. The mixture was then washed into a beaker with 250 ml. of acetic acid; 50 ml. of water was added and the mixture was cooled to 0–5° C. The diazo was added to the coupling solution at 0–5° C. over a 30 min. period. The dark reaction mass was agitated for four hours at 0–5° C. and then the precipitated solids were collected on a filter. The solids were washed with 2 liters of hot water and then dried in vacuo to give 59.5 g. (80% of theory) of the dye. A small portion of the dye was recrystallized twice from hot dimethylformamide to give a dark solid melting at 194–6° C. of structure.

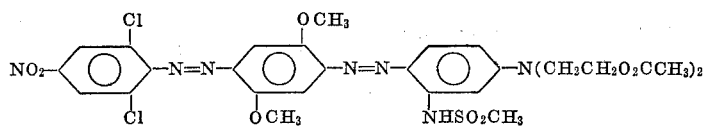

*Analysis.*—Calcd. for $C_{29}H_{31}N_7Cl_2SO_{10}$ (percent): C, 47.08; H, 4.22; N, 13.24; Cl, 9.58; S, 4.33. Found (percent): C, 47.9; H, 4.2; N, 11.7; Cl, 9.5; S, 4.0.

A milled paste of the dye prepared as in Example 1, gave Thermosol dyeings on polyester-cotton blends, as in Example 1, with a violet shade. The dyeings exhibited excellent fastness and working properties (i.e., caustic and hydrosulfite, and sulfide strip), as summarized by the data in Table I.

EXAMPLE 3

This dye was prepared as in Example 1 except that 29.0 g. (0.105 mole) of p-methoxybenzenesulfonyl chloride was used in place of the methanesulfonyl chloride; 62 g. (78%) of crude, dry dye was obtained. A portion of the crude dye was recrystallized from dimethylformamide to give a dark solid melting at 220–224° C. of structure:

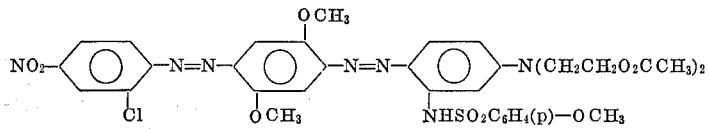

*Analysis.*—Calcd. for $C_{35}H_{36}N_7ClSO_{11}$ (percent): C, 52.63; H, 4.55; N, 12.28; Cl, 4.44; S, 4.02. Found (percent): C, 53.0; H, 4.5; N, 12.2; Cl, 4.6; S, 3.7.

A milled paste of the dye, as in Example 1, was used to dye polyester-cotton blends by the Thermosol method, as in Example 1, to yield navy blue shades with excellent fastness properties. Again, the caustic and hydrosulfite, and sodium sulfide strip from cotton was very good, as summarized by the data in Table I.

EXAMPLE 4

This dye was prepared following the procedure of Example 1 except that p-toluenesulfonyl chloride (21.0 g., 0.11 mole) was used in place of methanesulfonyl chloride. The crude dye (59.3 g., 76% of theory) was recrystallized from dimethylformamide to yield a dark colored solid melting at 255–7° C. (visible spectrum in DMF, $\lambda_{max}$ 588 m$\mu$, $\epsilon_{max}$ 46,000 l./mole/cm.), of structure:

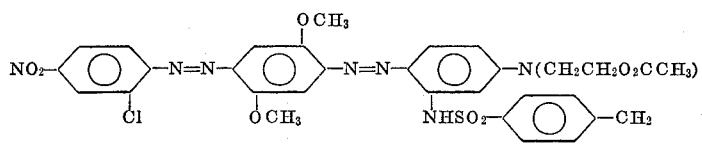

*Analysis.*—Calcd. for $C_{35}H_{36}N_7ClSO_{10}$ (percent): C, 53.72; H, 4.64; N, 12.53; Cl, 4.53; S, 4.10. Found (percent): C, 54.7 and 54.5; H, 5.0 and 5.4; N, 12.6 and 12.6; Cl, 4.6 and 4.7; S, 3.3 and 3.5.

A milled paste of the dye, as in Example 1, gave rise to Thermosol dyeing of polyester-cotton blends with a deep navy blue shade with excellent fastness properties. The residual dye on the cotton after Thermosol dyeing, was readily stripped with both caustic and hydrosulfite, and sodium sulfide, as summarized by the data in Table I.

EXAMPLE 5

This dye was prepared as in Example 1 except that 18.8 g. (0.11 mole) of p-chlorobenzenesulfonyl chloride was used in place of the methanesulfonyl chloride; 61.6 g. (77% of theory) of a dark solid was obtained. The crude dye was recrystallized twice from dimethylformamide to yield a black colored solid melting at 228–232° C. of structure:

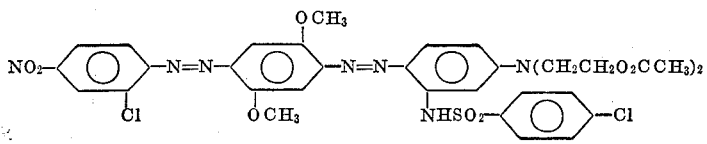

*Analysis.*—Calcd. for $C_{34}H_{33}N_7Cl_2SO_{10}$ (percent): C, 50.88; H, 4.14; N, 12.22; Cl, 8.84; S, 3.98. Found (percent): C, 51.3; H, 4.2; N, 13.0; Cl, 8.5; S, 2.9.

A milled paste of the dye, as in Example 1, was used to dye polyester cotton blends by the Thermosol method, as in Example 1, to yield navy blue shades with excellent fastness properties. The caustic and hydrosulfite, and sulfide scour of the dyed polyester/cotton blends were excellent, as summarized by the data in Table I.

EXAMPLE 6

A smooth paste was prepared from 32.6 g. (0.10 mole) of 4-(o-chloro-p-nitrophenylazo)-1-naphthylamine, 37.5 ml. (0.45 mole) of conc. hydrochloric acid, 100 ml. of acetic acid, and 250 ml. of water. The smooth paste was adjusted to 15° C.; 35.0 ml. (0.175 mole) of 5 N sodium nitrite was added over a 30 min. period at 15° C. The dark brown solid slowly turned to a pale brown solid. After stirring for one hour at 15° C., the excess nitrite was destroyed. The suspension of the insoluble diazo was added to a solution of 35.8 g. (0.10 mole) of 3′-[bis (2 - acetoxyethyl)amino]methanesulfonanilide dissolved in 100 ml. of acetic acid at 25° C. A solution of 30 g. (0.75 mole) of sodium hydroxide in 90 ml. of water was added dropwise over a period of one hour. The mixture was stirred for three hours at 25° C., then filtered. The solid on the filter was washed with three liters of water and then dried to give 63.2 g. (91%) of a dark solid of structure

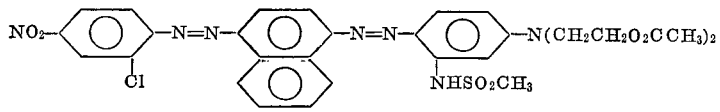

The recrystallized dye (from dimethylformamide) melted at 220–224° C.

*Analysis.*—Calcd. for $C_{31}H_{30}N_7ClSO_8$ (percent): C, 53.48; H, 4.34; N, 14.08; Cl, 5.09; S, 4.61. Found (percent): C, 53.6; H, 4.0; N, 14.5; Cl, 5.4; S, 4.4.

A milled paste of the dye, as in Example 1, was Thermosoled on polyester-cotton blends, as in Example 1, to yield navy blue shade with exceptionally good fastness and working properties. In particular, the lightfastness, temperature sensitivity and the caustic and hydro strip were excellent, as summarized by the data in Table I.

EXAMPLE 7

2′,4′-dinitro-2,5-dimethoxy - 4 - aminoazobenzene (30.0 g., 0.0865 mole) was diazotized as in Example 1. The coupler N′ - methanesulfonyl - N,N - bis-(2-acetoxyethyl) metaphenylene diamine, 0.10 mole, was prepared as in Example 1. The diazo was coupled and the resulting reaction mass was worked up as in Example 1. The crude dye was recrystallized from dimethylformamide to yield 13.0 g. (21%) of the dye [$\lambda_{max}$ 595 m$\mu$ (DMF), $\epsilon_{max}$ 46,200 l./mole/cm.] of structure:

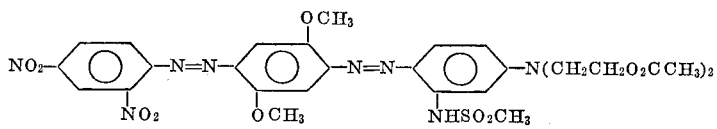

*Analysis.*—Calcd. for $C_{29}H_{32}N_8SO_{12}$ (percent): C, 48.60; H, 4.50; N, 15.64; S, 4.47. Found (percent): C, 48.6 and 49.2; H, 5.7 and 5.4; N, 15.5 and 15.6; S, 3.5 and 3.5.

A dispersion of the dye was prepared by milling 10 g. of the dye with 5 g. of a highly purified partially desulfonated sodium lignosulfonate. After milling, 5 g. of sorbitol was added and the resulting paste was used to dye polyester/cotton blends by the Thermosol method as described in Example 1. The resulting navy blue dyeings exhibited excellent fastness and working properties, as summarized by the data in Table I.

EXAMPLE 8

2′,4′ - dinitro - 2-methyl-5-methoxy-4-aminoazobenzene (0.050 mole) was diazotized in the usual manner (as in Example 1). The coupling solution was prepared by dissolving 15.0 g. (0.050 mole) of 2-methoxy-5-amino-N,N-bis(2-acetoxyethyl)aniline in 25 ml. of pyridine methanesulfonyl chloride (4.4 mole) was added at 10–15° C. The dark red solution was stirred at 10–15° C. for 30 minutes and then washed into a beaker with 100 ml. of acetic acid. The diazo solution was added over a 30 min. period, and then agitated for three hours, at 0–5° C. The precipitated solid was collected on a filter and washed with 1000 ml. of water. The solid was dried to give 12.4 g. (34%) of the dye. A portion of the dye was recrystallized from DMF to yield a dark solid melting at 215–217° C., of structure:

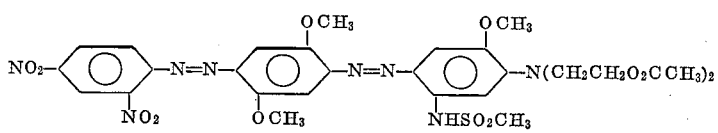

*Analysis.*—Calcd. for $C_{30}H_{34}N_8SO_{12}$ (percent): C, 50.00; H, 4.75; N, 14.17; S, 4.45. Found (percent: C, 49.1; H, 4.5; N, 15.1; S, 3.8.

A milled paste of the dye, as in Example 1, was Thermosoled on polyester/cotton blend fabrics, as in Example 1, to yield a navy blue shade with good fastness and working properties, as summarized by the data in Table I.

EXAMPLE 9

This dye was prepared as in Example 8, except that the coupling solution was prepared by dissolving 18.0 g. (0.050 mole) of N′-methanesulfonyl-N,N-bis(2-acetoxyethyl)-metaphenylenediamine in 100 ml. of acetic acid. The dye obtained (13.0 g., 38%) was recrystallized from DMF to give a dark solid melting at 217–219° C.

*Analysis.*—Calcd. for $C_{29}H_{32}N_8SO_{11}$ (percent): C, 50.43; H, 4.67; N, 14.78; S, 4.64. Found (percent): C, 49.9; H, 4.4; N, 15.0; S, 4.0.

A milled paste of the dye, as in Example 1, was Thermosoled on polyester/cotton blend fabrics, as in Example 1, to yield a blue violet shade with good fastness and working properties, as summarized by the data in Table I.

EXAMPLE 11

This dye was prepared following the procedure of Example 3 except that 3' - [N,N-bis-(2 - acetoxypropyl) amino]-p-methoxybenzenesulfonanilide was used as the coupler. The crude dye was recrystallized from DMF to yield 39 g. (47%) of the dye [M.P. 159–162° C., $\lambda_{max}$ 595 m$\mu$ (DMF), $\epsilon_{max}$ 49,000 l./mole/cm.] of structure:

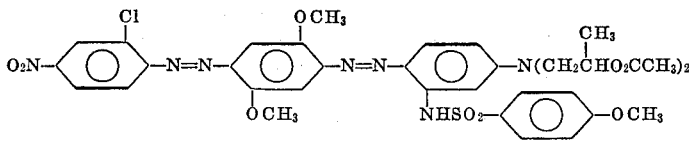

EXAMPLE 10

Synthesis of 3-[N,N-bis-(2-acetoxypropyl)amino]-nitrobenzene

A mixture of 104 g. (0.75 mole) of m-nitroaniline, 170 ml. (2.43 moles) of propylene oxide, 28 ml. of water and 28 ml. of acetic acid was heated at 75° C. for 18 hours. The resulting oily liquid was evaporated on a rotary evaporator to remove the solvents; 200 g. (2.0 mole) of acetic anhydride was added to the viscous oil and the mixture was heated at reflux (125–135° C.) for two hours. The reaction mass was drowned in 500 g. of ice water and the resulting mixture was neutralized with 30% caustic soda solution. The neutralized mixture was extracted with two 200 ml. portions of chloroform. The chloroform extracts were combined and washed with three 100 ml. portions of water. The chloroform solution was dried with magnesium sulfate, filtered, and the solvent was evaporated. A viscous red brown oil (162 g., 64%) was obtained whose infrared spectrum (neat) exhibited bands at 5.77, 6.55, 7.32 and 8.1$\mu$.

Synthesis of 3-[N,N-bis-(2-acetoxypropyl)amino]-aniline

3 - [N,N - bis - (2-acetoxypropyl)amino]-nitrobenzene (66.8 g., 0.20 mole) was reduced with hydrogen employing a platinum on charcoal catalyst in isopropyl alcohol solution. After the theoretical amount of hydrogen was absorbed, the catalyst was removed by filtration. The isopropyl alcohol solution of the amine was evaporated on a rotary evaporator. A pale tan oil (62 g., 100%) remained. This tan, viscous oil was subsequently reacted with methanesulfonyl chloride, as in Example 1, or p-methoxybenzenesulfonyl chloride, as in Example 3, to yield the final coupling components for this example and Example 11, respectively.

The disazo dye was prepared following the procedure of Example 1 except that 3' - [N,N-bis(2 - acetoxypropyl) amino]-methanesulfonanilide was used as the coupler giving a dye of structure:

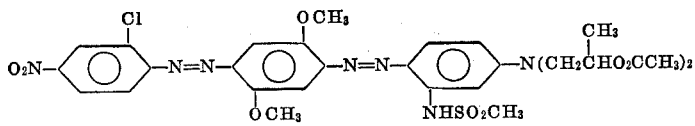

The crude dye was recrystallized from DMF to give 36 g. (49%) of a dark solid melting at 178–182° C. [$\lambda_{max}$ (DMF) 590 m$\mu$, $\epsilon_{max}$ 48,500 l./mole/cm.].

Analysis.—Calcd. for $C_{31}H_{36}N_7ClSO_{10}$ (percent): C, 50.68; H, 4.94; N, 13.36; Cl, 4.83; S, 4.37. Found (percent): C, 50.6; H, 4.8; N, 13.3; Cl, 5.4; S, 3.7.

A milled paste of the dye, as in Example 1, was Thermosoled on polyester/cotton blend fabric, as in Example 1, to yield a navy blue shade with good fastness and working properties, as summarized in Table I.

Analysis.—Calcd. for $C_{37}H_{40}N_7ClSO_{11}$ (percent): C, 53.79; H, 4.88; Cl, 4.29; N, 11.87; S, 3.88. Found (percent): C, 54.0; H, 4.7; Cl, 4.7; N, 11.6; S, 3.4.

A milled paste of the dye, as in Example 1, was Thermosoled on polyester/cotton blend fabric, as in Example 1, to yield a navy blue shade with good fastness and working properties, as summarized in Table I.

EXAMPLE 12

Synthesis of 2'-chloro-4'-nitro-5-methoxy-2-methylsulfonamido-4-aminoazobenzene A smooth paste was prepared from 34.2 g. (0.20 mole) of 2-chloro-4-nitroaniline, 200 ml. of water and 50 ml. (0.60 mole) of conc. hydrochloric acid. The mixture was cooled to 0–5° C., 100 g. of ice was added, and then 44 ml. (0.22 mole) of 5 N sodium nitrite was added rapidly. The mixture was stirred for 30 min. at 0–5° C. The excess nitrite was destroyed with sulfamic acid and the solution was filtered. The diazo was added rapidly to a solution containing 43.2 g. (0.20 mole) of 3'-amino-4'-methoxy-methanesulfonanilide (prepared by the method disclosed in U.S. 2,943,017 for the 2-amino isomer) dissolved in 25 ml. of conc. hydrochloric acid and 200 ml. of water at 10–15° C. The reaction mass was agitated for two hours at 10–15° C. and then neutralized with a 30% caustic soda solution. The solid was collected on a filter and washed with two liters of hot water. The solid was dried to give 70 g. of red brown crystals [88%, M.P. 238–240° C., $\lambda_{max}$ 540 m$\mu$ (DMF), $\epsilon_{max}$ 27,800 l./mole/ cm.].

A smooth slurry was prepared from 13.3 g. (0.033 mole) of 2'-chloro-4'-nitro - 2 - methanesulfonylamido-5-methoxy-4-aminoazobenzene, 50 ml. of acetic acid, 13 ml. (0.15 mole) of conc. hydrochloric acid and 50 ml. of water. The temperature was adjusted to 25° C. and then 10 ml. of 5 N sodium nitrite was added over a 15 minute period. The clear red solution was stirred for 45 minutes at 25° C. The excess nitrite was destroyed with sulfamic acid. Charcoal and Supercel were added and the solution was filtered.

The coupling solution was prepared by dissolving 10.0 g. (0.033 mole) of 2-methoxy-5-amino-N,N-bis(2-acetoxyethyl)aniline in 25 ml. of pyridine. Methanesulfonyl chloride (4.0 ml.) was added at 10–15° C. and the resulting mixture was stirred for one hour at 10–15° C. The pyridine solution of the coupler was washed into a beaker with 100 ml. of acetic acid. The diazo was then added at 25° C. over a 30 min. period. The coupling mass was stirred at 25° C. for 3 hrs. and then filtered. The solid was washed with 2 liters of water and then dried. The dried solid was recrystallized from DMF to yield 14 g. (52.6% of theory) of dye melting at 226–228° C. [$\lambda_{max}$ 583 m$\mu$ (DMF), $\epsilon_{max}$ 32,300 l./mole/cm.] of structure

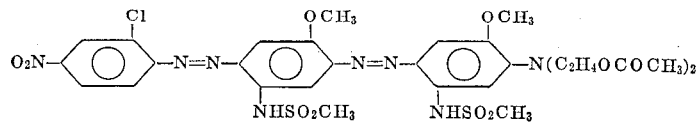

A fine dispersion of the dye was prepared using a sodium lignin sulfonate as the dispersing agent, as in Example 1. Thermosol dyeings, as in Example 1, blue in shade, were obtained on polyester-cotton blends which displayed excellent scouring properties and temperature sensitivity. The light, sublimation, ozone, gas fume, and perspiration fastness, both before and after durable press finishing were good, as summarized by the data in Table I.

EXAMPLE 13

This dye was prepared following the procedure of Example 1 except that 28.1 g. (0.10 mole) of 4'-cyano-2,5-dimethoxy-4-aminoazobenzene was diazotized and coupled with 0.10 mole of the coupler of Example 1. The crude dye (52.0 g., 80%) was recrystallized from DMF to yield a dark solid melting at 210–212° C. [$\lambda_{max}$ 560 m$\mu$ (DMF), $\epsilon_{max}$ 52,600 l./mole/cm.] of structure:

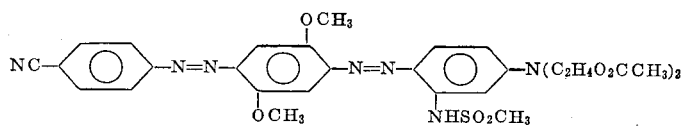

*Analysis.*—Calcd. for $C_{30}H_{33}N_7O_8S$ (percent): C, 55.28; H, 5.12; N, 15.05; S, 4.92. Found (percent): C, 55.1; H, 5.1; N, 15.0; S, 4.3.

A fine dispersion of the dye, as in Example 1, was used to dye polyester-cotton blends, as in Example 1, a violet shade. The cotton scouring properties were excellent, as summarized by the data in Table I.

EXAMPLE 14

This dye was prepared following the procedure of Example 1, except that 30.2 g. (0.10 mole) of 4'-nitro-2,5-dimethoxy-4-aminoazobenzene was diazotized and coupled with 0.10 mole of coupler of Example 1. The crude dye (49.4 g., 73.5%) was recrystallized from DMF to yield a dark solid melting at 208–211° C. [$\lambda_{max}$ 570 m$\mu$ (DMF), $\epsilon_{max}$ 47,200 l./mole/cm.], of structure

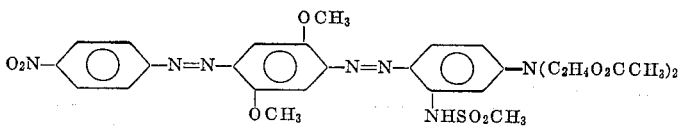

*Analysis.*—Calcd. for $C_{29}H_{33}N_7SO_{10}$ (percent): C, 51.88; H, 4.95; N, 14.61; S, 4.78. Found (percent): C, 52.4; H, 5.0; N, 14.4; S, 4.4.

A fine dispersion was prepared, as in Example 1, and used to dye polyester-cotton blends by the Thermosol method, as in Example 1, to yield dyeing blue-violet in shade. The scouring properties and fastness properties were good, as summarized by the data in Table I.

EXAMPLE 15

2'-trifluoromethyl-4'-nitro-2,5-dimethoxy-4-aminoazobenzene (12.3 g., 0.033 mole) was slurried in 50 ml. of acetic acid, 12.5 ml. of conc. hydrochloric acid, and 100 ml. of water. Five N sodium nitrite (15 ml., 0.045 mole) was added over a 30 min. period at 25° C. The dark red solution was stirred at 25° C. for 45 min. The excess nitrite was destroyed with sulfamic acid; charcoal and a filter acid (1 g. each) were added and the solution was filtered. The diazo was added to a solution of 15 g. 3-methanesulfonyl amino-N,N-bis(2'-acetoxyethyl)-aniline dissolved in 50 ml. of acetic acid at 25° C. over a 30 min. period. After adding the diazo, a solution of 5 g. of sodium hydroxide in 20 ml. of water was added dropwise. The reaction mass was agitated at 25° C. for three hours. The precipitated solid was collected on a filter and washed with 2 liters of water. The solid was dried to give 20.6 g. of black colored solid. The dye was recrystallized from dimethylformamide to give a dark colored solid melting at 212–214° C. [$\lambda_{max}$ 590 m$\mu$ (DMF), $\epsilon_{max}$ 48,900 l./mole/cm.] with the following structure:

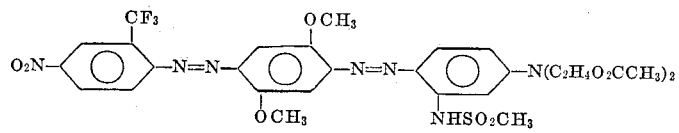

*Analysis.*—Calcd. for $C_{30}H_{32}N_7SF_3O_{10}$ (percent): C, 48.73; H, 4.36; N, 13.27; S, 4.34; F, 7.71. Found (percent): C, 49.5; H, 4.7; N, 13.0; F, 7.16; S, 4.5.

The dye was milled in the presence of a sodium lignin sulfonate to a fine dispersion. This dispersion was used to dye polyester-cotton blends by the Thermosol method, as in Example 1, to give navy blue dyeings. The residual dye on the blend surface could be scoured off with both caustic and hydrosulfide and with sodium sulfide. The fastness and general working properties were good, as evidenced by the data in Table I.

EXAMPLE 16

This dye was prepared as in Example 15 except that 2-methoxy-5-methanesulfonylamino-N,N-bis(2-acetoxyethyl)aniline was used as the coupler. From 0.033 mole each of diazo and coupler, there was obtained 14.1 g. of the crude dye. The crude dye was recrystallized from dimethylformamide to yield a dark colored solid melting at 207–209° C. [λ_max 597 mμ (DMF) ε_max 41,700 l./mole/cm.] with the following structure:

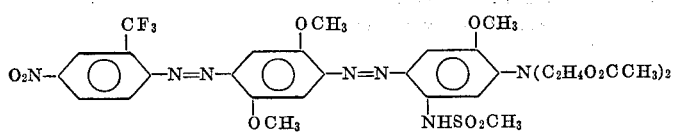

*Analysis.*—Calcd. for $C_{31}H_{34}N_7SF_3O_{11}$ (percent): C, 48.39; H, 4.45; N, 12.75; S, 4.7; F, 7.41. Found (percent): C, 48.3; H, 4.5; N, 12.8; S, 4.4; F, 7.3.

The dye was milled to a fine dispersion in the presence of a sodium lignin sulfonate. The dispersion was used to dye polyester-cotton blends by the Thermosol method, as in Example 1, in a navy blue shade. The fastness and general working properties were good, as evidenced by the data in Table I.

EXAMPLE 17

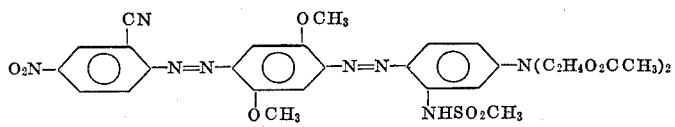

This dye was prepared following the procedure of Example 1 except that 32.7 g. (0.10 mole) of 2'-cyano-4'-nitro-2,5-dimethoxy - 4 - aminoazobenzene was diazotized and coupled with 0.10 mole of the coupler. The crude dye (33.7 g., 48.4%) was recrystallized from dimethylformamide to give a dark solid melting at 233–234° C. [λ_max 605 mμ (DMF), ε_max 55,600 l./mole/cm.].

*Analysis.*—Calcd. for $C_{30}H_{32}N_8SO_{10}$ (percent): C, 1.76; H, 4.63; N, 16.08; S, 4.60. Found (percent): C, 52.1; H, 4.6; N, 16.2; S, 4.5.

The dye was milled to a fine dispersion in the presence of a sodium lignin sulfonate. The dye dispersion was used to dye polyester-cotton blends by the Thermosol method and gave dyeings blue in shade; the dye test results are given in Table I.

EXAMPLE 18

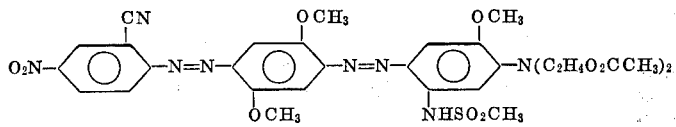

This dye was prepared following the procedure of Example 1 except that 4.4 g. (0.0135 mole) of 2'-cyano-4'-nitro - 2,5 - dimethoxy-4-aminoazobenzene was diazotized and coupled with 5.0 g. (0.0135 mole) of 2,2'-[2-methoxy-5 - methanesulfonamidophenylimino]diethanol diacetate ester. The crude dye (3.3 g., 34%) was recrystallized from dimethylformamide to yield a dark solid melting at 234–236° C. [λ_max 615 mμ (DMF), ε_max 43,600 l./mole/cm.].

*Analysis.*—Calcd. for $C_{31}H_{34}N_8SO_{11}$ (percent): C, 51.23; H, 4.71; N, 15.42; S, 4.41. Found (percent): C, 51.4; H, 4.7; N, 15.5; S, 4.3.

The dye was milled to a fine dispersion with a sodium lignin sulfonate and the dispersion was used to dye polyester-cotton blends by the Thermosol method to a blue shade. The dye test results are given in Table I.

EXAMPLE 19

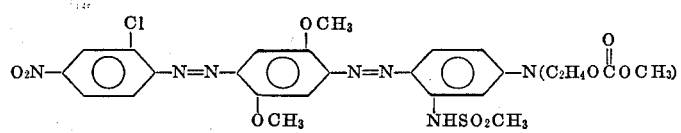

This dye was prepared following the procedure of Example 1 except that 23.4 g. (0.10 mole) of 4-aminoazobenzene hydrochloride was diazotized and coupled with 0.10 mole of 3' - [bis(2 - acetoxyethyl)amino]methanesulfonanilide. The crude dye (52 g., 92%) was recrystallized from dimetyhlformamide to yield a red-brown solid melting at 149–152° C. [λ_max 493 mμ (DMF), ε_max 41,500 l./mole/cm.].

*Analysis.*—Calcd. for $C_{27}H_{30}N_6SO_6$ (percent): C, 57.25; H, 5.34; N, 14.84; S, 5.66. Found (percent): C, 57.1; H, 5.7; N, 14.7; S, 5.4.

The dye was milled to a fine dispersion in the presence of a sodium lignin sulfonate. This dispersion was used to dye, by the Thermosol method, polyester-cotton blends in a bright orange shade. The dyeings exhibited excellent shade reproducibility, and fastness properties both before and after a durable press finish. The residual dye on the surface of the cotton was readily scoured with both caustic and hydrosulfite, and with sodium sulfide. The dye test results are given in Table I.

EXAMPLE 20

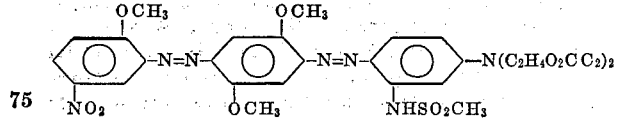

This dye was prepared as in Example 1 except that 3' - [bis(2 - methylcarbonatoethyl) - amino]methanesulfonanilide was used as the coupler. From 0.050 mole each of the diazo component and coupler, 33.8 g. (45.8%) of the crude dye was obtained. The crude dye was recrystallized from dimethylformamide to yield a dark solid melting at 210–212° C. [λ_max 582 mμ (DMF), ε_max 47,900 l./mole/cm.].

A fine dispersion of the dye was prepared using a sodium lignin sulfonate as the dispersing agent. The dye dispersion was used to dye polyester-cotton blends by the Thermosol method to give a navy blue shade. The residual dye on the fiber surface was readily scoured off with both caustic and hydrosulfite, and with sodium sulfide. The Thermosol temperature sensitivity was good. The fastness properties (light, ozone, and wash) were excellent, as shown by the data in Table I and II.

EXAMPLE 21

This dye was prepared following the procedure of Example 1 except 33.2 g. (0.10 mole) of 5'-nitro-2',2,5 - trimethoxy - 4 - aminoazobenzene was diazotized and coupled with 35.8 g. (0.10 mole) of the coupler. The crude dye (53 g., 75.6%) was recrystallized from dimethylformamide to yield a dark solid melting at 215–218° C. [$\lambda_{max}$ 553 m$\mu$ (DMF), $\epsilon_{max}$ 47,900 l./mole/cm.].

*Analysis.*—Calcd. for $C_{30}H_{35}N_7SO_{11}$ (percent): C, 51.39; H, 5.03; N, 13.98; S, 4.57. Found (percent): C, 52.2; H, 6.6; N, 13.6; S, 4.1.

The dye was milled to a fine dispersion using a sodium lignin sulfonate as the dispersing agent. The dye dispersion was used to dye polyester-cotton blends by the Thermosol method to yield violet dyeings with good scouring properties. In addition, the wash, perspiration and lightfastness were good both before and after a durable press finish, as indicated by the data in Table I.

EXAMPLE 22

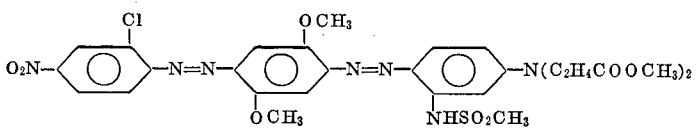

This dye was prepared following the procedure of Example 1 except that 16.8 g. (0.050 mole) of 2'-chloro-4' - nitro - 2,5 - dimethoxy - 4 - aminoazobenzene was diazotized and coupled with 18 g. (0.050 mole) of 3, 3' - [m(methylsulfonamido) - phenylimino]dipropionic acid, dimethyl ester. The resulting crude dye (25.0 g., 70.8%) was recrystallized from dimethylformamide to yield a dark solid melting at 190–193° C. [$\lambda_{max}$ 587 m$\mu$ (DMF), $\epsilon_{max}$ 49,000 l./mole/cm.].

*Analysis.*—Calcd. for $C_{29}H_{32}N_7ClSO_{10}$ (percent): C, 49.33; H, 4.57; N, 13.89; Cl, 5.02; S, 4.54. Found (percent): C, 49.5; H, 5.6; N, 13.8; Cl 5.7; S, 3.9.

The dye was milled to a fine dispersion with a sodium lignin sulfonate as the dispersing agent. The dye dispersion was used to dye, by the Thermosol method, polyester-cotton blends in a navy blue shade. The residual, unfixed dye could be readily scoured off the fiber surface with both caustic and hydrosulfite, and with sodium sulfide. The dye exhibited good shade reproducibility in Thermosol dyeings. The dyeings exhibited excellent fastness to light, perspiration, and washing both before and after a durable press finish, as evidenced by the data in Table I.

EXAMPLE 23

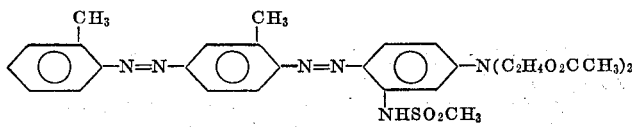

This dye was prepared following the procedure of Example 1 except that 22.5 g. (0.10 mole) of aminoazotoluene was diazotized and coupled with 35.8 g. (0.10 mole) of 3' - [bis(2-acetoxyethyl)amino]methanesulfonanilide. The crude dye (49.0 g., 82.5%) was recrystallized from dimethylformamide to yield a dark red solid [M.P. 133–135° C., $\lambda_{max}$ 497 m$\mu$ (DMF), $\epsilon_{max}$ 43,700 l./mole/cm.].

*Analysis.*—Calcd. for $C_{29}H_{34}N_6SO_6$ (percent): C, 58.59; H, 5.76; N, 14.13; S, 5.39. Found (percent): C, 59.0; H, 6.3; N, 13.5; S, 4.9.

A fine dispersion of the dye was used to dye polyester-cotton blends by the Thermosol method in a red-orange shade. The dye test data are given in Table I.

The Thermosol method, cleaning procedure and durable press steps set forth in the preceding representative examples are summarized as follows:

(A) Thermosol method

A pad bath is prepared containing

| | G./l. |
|---|---|
| Disperse dye | $x$ |
| Refined solution of natural gums | 20.0 |
| Sodium hydrocarbon sulfonate | 0.5 |

Pad bath is padded on "Dacron" aromatic polyester/cotton fabric with a pickup of 50–65% followed by drying (infrared predrying followed by hot air or hot can drying is desirable) to remove the water.

Thermosoling, in which the "Dacron" component is dyed with the disperse color, is accomplished by treating the dried pigment-padded fabric for 90 seconds at temperatures ranging from 400° to 430° F. Unfixed dye, whether on the "Dacron" or cotton, is removed as described below.

(B) Cleaning

The fabric, after Thermosoling, is padded with either Bath No. 1 or Bath No. 2.

Bath
No. 1:
 50 g./l. sodium hydroxide
 40 g./l. sodium hydrosulfide
 At 80°–100° F.

No. 2:
 60 g./l. sodium sulfide
 At 180°–200° F.

Further processing is as follows.

Bath No. 1:
 (1) Steam 30 seconds.
 (2) Rinse at 80° F.
 (3) Oxidize in 2.5 g./l. sodium perborate for 10 minutes at 120° F.
 (4) Rinse at 80° F.
 (5) Hot scouring in 2 g./l. sodium salt of a fatty alcohol sulfate for 1 minute at 200° F.
 (6) Rinse at 80° F.
 (7) Extract and dry.

Bath No. 2:
 (1) Steam 60 seconds.
 (2) Hot rinse at 180° F.
 (3) Oxidize in 3 g./l. sodium bichromate and 3 g./l. acetic acid for 2 minutes at 140° F.
 (4) Rinse cold.
 (5) Rinse hot 200° F.

Bath No. 2:
   (6) Optional: hot soaping for ½ minute.
   (7) Hot rinse.
   (8) Extract and dry.

Cleaning has the following significance: Application of Bath No. 1, sodium hydrosulfite and sodium hydroxide, simulates application of vat dyes to the cotton component. Vat dyes would be added to the bath containing the disperse dye. Chemical padding with Bath No. 1 serves two purposes, (1) it reduces the vat dye so it can be affixed to the cellulosic fibers in the blend, (2) and removes, preferably by chemical alteration, residual disperse dye to prevent subsequent staining during washing by the ultimate consumer.

Application of Bath No. 2 simulates application of sulfur dyes to the cellulosic part of the blend; otherwise the purpose is similar.

(C) Durable press

After dyeing and cleaning, the "Dacron" component of the blend will be colored with a disperse dye and, in most cases, the cotton will be dyed either with vat dyes or sulfur dyes. (The choice of dyes on cellulosics is dictated by fastness requirements and economics.) The material is then padded with a pickup of 50–65% with a bath containing:

| | G./l. |
|---|---|
| Permafresh 183 | 200.0 |
| Triton X–100 | 2.5 |
| Mykon SF | 22.5 |
| Rhoplex HA–8 | 22.5 |
| Silkand 40 | 30.0 |
| Catalyst X–4 | 36.0 |

Permafresh 183 (also called Permafresh Reactant 183) is an imidazolidone derivative which serves as the reactant for wash-wear garments by the deferred curing process. Triton X–100 is an alkylaryl-polyether alcohol which serves as a wetting and emulsifying agent. Rhoplex HA–8 is an acrylic dispersion of a thermoplastic resin which serves as a binder (manufacturer—Rohm and Haas Co.). Catalyst X–4 (also called Sun Kem Catalyst X–4) is a curing catalyst for thermosetting resins. It contains a zinc salt complex (manufacturer—Sun Chem. Corp.; Warwick Textile Products). Mykon SF is a nonionic paraffin-free, polyethylene emulsion which serves as a fabric softener (manufacturer—Sun Chem. Corp.; Warwick Textile Products). Silkand 40 is a nonionic polymer emulsion which imparts luster, a silky hand, and antistatic properties to the fabric.

The resin-impregnated material is then dried to remove the water content. At this point, the resin is not cured; the goods are referred to as being "sensitized." The garment is cut from the "sensitized" goods and after assembly, by sewing, the garment is placed on suitable frames which are led into a cure chamber where curing takes place at about 325° F. for 15 minutes. It is very important that the disperse dyes in the garment show minimum sublimation during curing, otherwise pockets, etc., generally made of nylon, will be stained by subliming disperse dye vapor. The invention dye results are satisfactory for besides good sublimation fastness, the cotton component (and the exterior portion of the "Dacron") will be free from the disperse dye. The finished garment is not washed by the manufacturer. The first washing will be done by the housewife and she will observe no staining of other fibers in the wash.

Ratings are as follows: 5—negligible or none; 4—slight; 3—noticeable; 2—considerable; 1—very much; Br—bright; S—strong; W—weak.

TABLE I.—DYE-TEST RATINGS OF THE DISAZO EXAMPLE DYE

| Ex. | Shade | Dry level (g. 100% dye) per liter | Caustic and Hydro scour [1] | Sulfide scour [1] | Temp. Sen. 400° vs. 430° F. | Bloom on D.P. Finish | Lightfastness (carbon arc., 20 hrs.) Untreated | Lightfastness (carbon arc., 20 hrs.) Treated [2] |
|---|---|---|---|---|---|---|---|---|
| 1 | Navy blue | 13.7 | 5 | 4 | 3D, S | 2S | 5 | 4–3W |
| 2 | Violet | 7.7 | 5 | 3–2 | 3S | 3–2S | 4–3D, W | 4–3W |
| 3 | Navy blue | 13.8 | 3 | 2–1 | 2S | 3–2S | 4–3BR | 4–3W |
| 4 | do | 13.7 | 4 | 3 | 2S | 2S | 5–4W | 4W |
| 5 | do | 13.7 | 5–4 | 3–2 | 2S | 3D | 4W | 4–3BR |
| 6 | do | 13.7 | 5 | 3–2 | 4–3D | 3D,S | 5 | 5–4W |
| 7 | do | 10.9 | 5 | 3–2 | 3–2D | 2 | 5 | 5–4W |
| 8 | do | 13.7 | 5 | 2R | 3–2D | 2S | 4–3D | 4–3W |
| 9 | Blue-violet | 13.7 | 5 | 2R | 3–2S | 2S | 5–4W | 4W |
| 10 | Navy blue | 18.4 | 5–4 | 3–2 | 2S | 2S | 4BR | 4W |
| 11 | do | 18.4 | 5–4 | 3–2 | 2S | 2S | 4W | 3W |
| 12 | do | 7.14 | 5 | 5–4 | 3S | 3S | 4–3W | 3W |
| 13 | Violet | 11.9 | 5 | 5–4 | 2S | 2S | 4D, W | 3D, W |
| 14 | Blue-violet | 7.5 | 5 | 4 | 4S | 2S | 5–4W | 5–4W |
| 15 | Navy blue | 7.5 | 5 | 3–2 | 3S | 3–2S | 3W | 3–2W |
| 16 | do | 7.5 | 5 | 3–2 | 2S | 2S | 4W | 4–3W |
| 17 | do | 7.5 | 5 | 3 | 2S | 2S | 4–3 | 4–3 |
| 18 | Blue | 7.5 | 5 | 5–4 | 1S | 2S | 3D,W | 3D.W |
| 19 | Orange | 7.5 | 5 | 3 | 5–4S | 4–3S | 4W | 4–3W |
| 20 | Navy blue | 7.5 | 5 | 2 | 5–4S | 3S | 5–4W | 5–4W |
| 21 | Violet | 7.5 | 5 | 4–3 | 3S | 3D,S | 3W | 3W |
| 22 | Navy blue | 13.5 | 5 | 4 | 4S | 3–2S | 5–4S | 4W |
| 23 | Red-orange | 7.5 | 5 | 2 | 5 | 2D,S | 4D,W | 3W |

| Ex. | AATCC #3 wash [2] Shade Change | AATCC #3 wash [2] Acetate stain | AATCC #3 wash [2] Nylon stain | Alkaline perspiration [2] Shade change | Alkaline perspiration [2] Acetate stain | Alkaline perspiration [2] Nylon stain | Sublimation stain at 400° F. | Crocking Wet | Crocking Dry |
|---|---|---|---|---|---|---|---|---|---|
| 1 | 3W | 5 | 3–2 | 3–2R | 5 | 5 | 5 | 4 | 5–4 |
| 2 | 3–2W | 5 | 5–4 | 4–3W | 5 | 5 | 5 | 4 | 4 |
| 3 | 5 | 5–4 | 4 | 3R | 5–4 | 5–4 | 5 | 5–4 | 5 |
| 4 | 5–4 | 5 | 5 | 4–3R | 5 | 5 | 5 | 3 | 3–2 |
| 5 | 5 | 5 | 5 | 3–2R | 5 | 5–4 | 5 | 5 | 5 |
| 6 | 3BR | 5 | 4 | 5 | 5 | 5 | 5 | 5 | 5 |
| 7 | 3W | 5 | 4–3 | 3D | 5–4 | 5 | 5 | 4 | 5 |
| 8 | 3–2W | 5 | 4–3 | 4RW | 5 | 5 | 5 | 5 | 5 |
| 9 | 3–2W | 5–4 | 4–3 | 4–3R,W | 5 | 5 | 5 | 5 | 5 |
| 10 | 2W | 5 | 4–3 | 3–2W | 5 | 5 | 5 | 4–3 | 5–5 |
| 11 | 3–2 | 5–4 | 4 | 4–3R | 5 | 5 | 5 | 4–3 | 5–4 |
| 12 | 3W | 5 | 5–4 | 4W | 5 | 5–4 | 5 | 5–4 | 5–4 |
| 13 | 3W | 5 | 3 | 3R,W | 5 | 5 | 5 | 4 | 5–4 |
| 14 | 3W | 5 | 3 | 3R | 5 | 5 | 5 | 5–4 | 5–4 |
| 15 | 3W | 5 | 4 | 4D | 5 | 5 | 5 | 5–4 | 5–4 |
| 16 | 3W | 5 | 4 | 4R,D | 5 | 5 | 5 | 4 | 5–5 |
| 17 | 3W | 5–4 | 3 | 4R | 5 | 5–4 | 5 | 4 | 4 |
| 18 | 4W | 5 | 4 | 5–4R | 5 | 5 | 5 | 5–4 | 5 |
| 19 | 4W | 5–4 | 4 | 4D,W | 5 | 5–4 | 5 | 4–3 | 5–5 |
| 20 | 3W | 5–4 | 3 | 3R | 5–4 | 4 | 5 | 5–4 | 5–5 |
| 21 | 4W | 5 | 4 | 4W,R | 5 | 5 | 5 | 5–4 | 4 |
| 22 | 3W | 5 | 3 | 3R | 5 | 5 | 5 | 4 | 5–4 |
| 23 | 3W | 5 | 4–3 | 4W | 5 | 5–4 | 5 | 4–3 | 5–4 |

[1] Polyester-cotton checkerboard fabric, Thermosol dyed, and then scoured.
[2] Thermosol dyed polyester-cotton blend, caustic and hydrosulfite scoured, and then durable press finished.

The following art recognized dyeing procedures may be utilized to apply the novel dyes of this invention to polyester fibers and blends thereof.

Dyeing procedure.—Aqueous dyeing vistamatic machine 40:1 volume

Bath set at 130° F. with one-half of total volume and 1.0% "Alkanol" HCS surface active agent, 2.0% "Avitone" T dyeing assistant, 2.0 g./l. monosodium phosphate (to maintain a pH of approximately 6.0), 5.0 g./l. "Carolid" (dispersed in permutit water at 212° F.) and thoroughly mixed. For dyeings stronger than 3.0% strength (powder) 7.5 g./l. "Carolid" was used. X% dye, pasted with permutit water at 130° F., added and bath made to total volume, and mixed well, "Dacron" fiber added and temperature raised to 208° F. After dyeing for two hours at this temperature the "Dacron" was rinsed and dried. This procedure was also used to dye 50/50 "Dacron" type 64/wool fabric.

Dyeing procedure.—Pressure dyeing-package machine 15:1 volume

"Dacron" loaded in machine and bath set at 120° F. X% dye, dispersed with 1.0% "Avitone" T added and liquor circulated, pH adjusted to 5.0–5.5 with acetic acid, temperature raised to 200° F. and held for 30 minutes. Temperature raised to 250° F. and dyed for one hour. Bath cooled and dyeing rinsed and scoured for 15 minutes at 180° F. with: 2.0% "Duponol" RA surface active agent, rinsed well and dried. Dyeings were also made according to this procedure with the addition of 3.0 g./l. DAC 888, which was added to the bath at 120° F.

Chemical equivalents or source for the trade name products, cited in the preceding dyeing procedures, are as follows:

"Alkanol" HCS—Nonionic surfactant, long chain alcohol condensate with ethylene oxide.
"Avitone" T—Long chain hydrocarbon sulfonate composition.
"Carolid"—Self-emulsifiable modified phenol derivative.
"Duponol" RA—Alcohol ether sodium sulfate.
DAC 888—A butyl benzoate carrier.

The above trade name products are identified in McCutcheon's Detergents and Emulsifiers, 1966 Annual, or A.A.T.C.C. Technical Manual, 1963.

These procedures result in dyeings reflecting good light-, sublimation-, and wash-fastness properties.

This invention includes a superior combination of dyes for dyeing polyester fibers to a full black shade, particularly by a continuous, e.g., Thermosol, procedure. Thus, it has been found that the combination of pastes or fine aqueous dispersions of disazo navy blue disperse dyes have unexpected excellent properties. The essential, major component is selected from disazo dyes of the following heretofore defined structure:

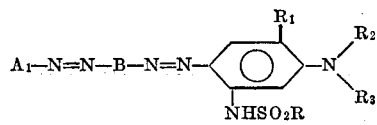

A preferred combination for dyeing polyester fibers a full black shade is prepared by utilizing, as the major component, a navy blue dye, from disazo dyes having the following subgeneric structure heretofore defined:

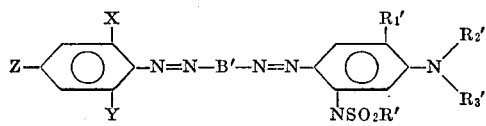

This invention includes a mixture of disperse dyes for obtaining black shades on polyester fibers whose main constituent consists of the disazo blue dyes heretofore described, and, as a minor constituent, monoazo dyes of the following structure:

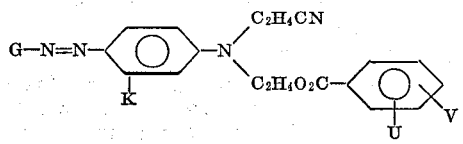

wherein: G=a substituted phenyl group bearing up to 3 substituents selected from the group —NO$_2$, halogen, —CN, C$_{1-4}$ alkyl, lower alkoxy, trifluoromethyl, C$_{1-4}$ alkylsulfonyl, phenylsulfonyl, C$_{1-4}$ N-alkylsulfamyl, C$_{1-4}$ N-alkylcarboxamido, C$_{1-4}$ carbalkoxy, benzoyl, and N-phenylsulfamyl; U and V=the same or different substituents selected from the group H, halogen, lower alkyl, nitro, lower acyloxy and lower alkoxy; K=hydrogen, lower alkyl, lower alkoxy or halogen; and, optionally, also as a minor constituent.

Anthraquinone dyes of the formula:

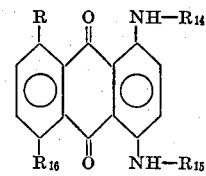

where R$_{16}$=both H or OH; R$_{14}$ and R$_{15}$=phenyl or substituted phenyl groups.

Subgenerically, this invention includes mixtures of disperse dyes for obtaining black shades on polyester fibers whose main constituent consists of disazo blue dyes heretofore defined, and as a minor constituent, monoazo dyes of the following structure:

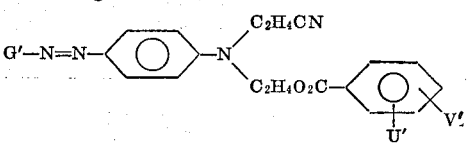

wherein G'=a substituted phenyl group bearing up to 3 substituents selected from the group —CN, halogen, —NO$_2$, —CF$_3$, benzoyl, phenylsulfonyl, C$_{1-4}$ alkyl, lower carbalkoxy, lower N-alkylsulfamyl, and N-phenylsulfamyl; U' and V'=the same or different substituents selected from the group H and acetoxy, and optionally, as a minor constituent, anthraquinone dyes such as

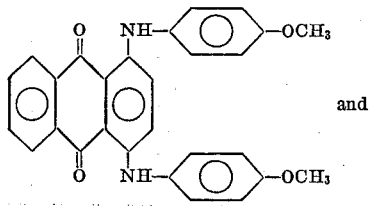

and

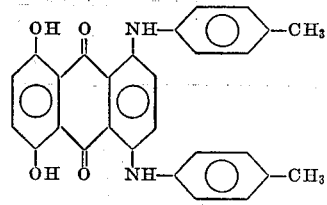

This invention also encompasses the process of dyeing polyester fibers with the dyes heretofore described, preferably by padding polyester fibers, either singly or in cellulosic blends, with an aqueous dispersion of said dyestuffs followed by dry heat (e.g., Thermosol) fixation; it is clear that this may be followed by durable press treatment as herein described.

An optional variation for dyeing polyester fibers a full black shade includes utilizing a composition having as major component the disazo navy blue dyes heretofore defined in conjunction with, as a minor component, yellow brown monoazo dyes of the following structure:

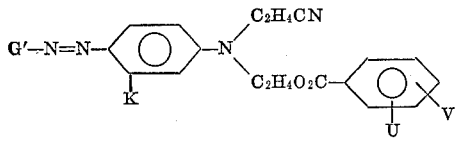

wherein: G′=a substituted phenyl group bearing up to 3 substituents selected from the group —NO₂, halogen, —CN, C₁₋₄ alkyl, lower alkoxy, trifluoromethyl, C₁₋₄ alkylsulfonyl, phenylsulfonyl, C₁₋₄ N-alkylsulfamyl, C₁₋₄ N-alkylcarboxamido, C₁₋₄ carbalkoxy, benzoyl, and N-phenylsulfamyl; U and V=the same or different substituents selected from the group H, halogen, lower alkyl, nitro, lower acyloxy, and lower alkoxy, K=lower alkyl, lower alkoxy, halogen, or hydrogen.

A preferred variation of dyeing polyester fibers a full black shade includes utilizing a composition having, as major component, the disazo navy blue dyes sub-generically defined and, as a minor component, of the following structure:

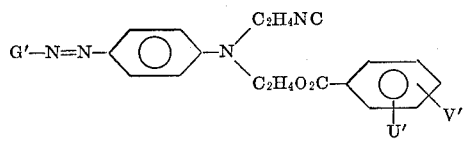

wherein G′=a substituted phenyl group bearing up to 3 substituents selected from the group —CN, halogen, —NO₂, —CF₃, benzoyl, phenylsulfonyl, C₁₋₄ alkyl, lower carbalkoxyl, lower N-alkylsulfamyl, and N-phenylsulfamyl; U′ and V′=the same or different substituents selected from the group H and acetoxy.

The utility and properties of these disperse dye mixtures for dyeing polyester fibers a full black shade may be illustrated with the preferred species described below. The comments cited for the preferred species, it should be emphasized, are equally applicable to each specific embodiment of this invention.

Thus, it has been found that the combination of pastes or fine aqueous dispersions of disazo navy blue disperse dyes, illustrated by

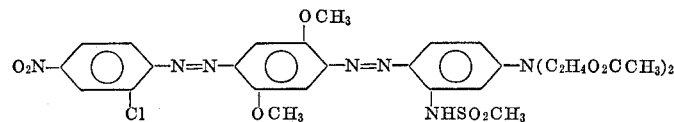

with pastes or fine aqueous dispersions of monoazo yellow-brown dyes, illustrated by

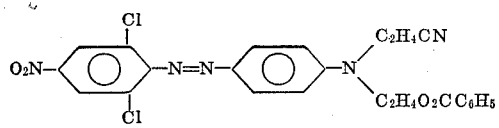

may be conveniently padded and thermosoled, by conventional methods, on polyester fabrics and polyester/cellulosic blend fabrics. This procedure, using as major component a disazo navy blue dye and as minor component a monoazo yellow-brown dye, will dye polyester fibers jet black. This procedure is particularly effective on polyester/cellulosic blends, whose cellulosic component is subsequently dyed with conventional vat or sulfur dyes. This effectiveness is attributed to the ease of scourability of any residual disperse dye off the cellulosic component by the reducing agents conventionally used in subsequently applying vat or sulfur dyes, e.g., sodium hydro-sulfite or sodium sulfide.

Thus, when a polyester/cellulosic blend fabric is padded and Thermosoled with the dyes illustrated in the preceding paragraphs, and the blend fabric is then treated with a simulated vat or sulfur dye chemical reducing pad solution, a pleasing two-toned fabric results in which the polyester component is dyed a jet black and the cotton remains, in contrast, white or near white. The resulting dyeing is fast to light, washing, rubbing, gas fumes, ozone fumes, dry cleaning fluids, both acid and alkaline perspiration and shows negligible staining of white "Dacron" fabric when subjected to standard sublimation tests.

It is to be noted that the tests listed herein are well known to those versed in this art; all may be found in the A.A.T.C.C. Technical Manual which issues each year and is published by Howes Publishing Co. Inc., 44 E. 23rd St., New York, N.Y. 10010.

A very important feature of this invention is the outstanding properties of the jet black shade on polyester components which have been treated with the optional durable press finishes. This attribute is extremely significant for the current commercial market. The utility of the black dye mixtures of this invention for the durable press market is evidenced by the very good fastness found on durable press resin treated polyester/cellulosic blends to all of the tests described in the preceding paragraph.

In the preceding, dyeing the polyester component has been the prime subject. In actual commercial practice, however, the cellulosic component would also be dyed. Thus, another important attribute of this invention is compatibility with currently practiced dyeing procedures. To exemplify this method, after padding and Thermosoling the disperse diasazo and monoazo dyes, as illustrated earlier in this specification, black sulfur dyes or black vat dyes may be conventionally applied. The resulting polyester/cellulosic blend fabric is a solid jet black; the polyester component is dyed with the disperse black mix and the cellulosic component with the sulfur or vat black dyes. Moreover, these blended, solid jet black fabrics may be further durable press resin treated. The fastness to the tests described previously are fully satisfactory on both the resin treated and non-resinated goods.

The black mixture of disperse dyes of this invention are preferably applied to 50:50 or 65:35 polyester/cellulosic blends. However, they also have utility on 100% polyesters fabrics and blends containing as low as 15% polyester fiber.

For some end uses, a greener shade of black is desired on the polyester component. This may be effectively accomplished with the disperse dyes of this invention by the addition of a minor amount of suitable anthraquinone dyes, preferably of the following structure:

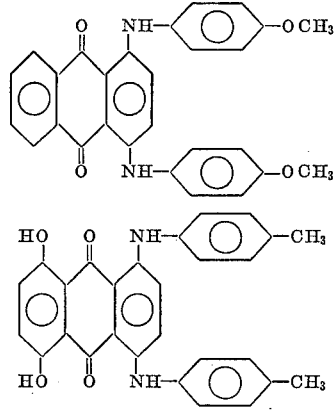

Incorporation of minor amounts of the above two, shading anthraquinone dyes, gives greenish-black shades on the polyester components with equal good fastness properties, both with and without durable press treatment, as observed when the anthraquinone dye is omitted. When the anthraquinone, green shading component is omitted, a pleasing reddish-toned black is obtained.

The good fastness properties are relatively free from concentration effects. Thus, varying the concentrations given in Examples 24–26 and 28 by ±30% had essentially no influence on the good fastness. Disperse dye concentrations higher than 30% of the foregoing examples were wasteful and did not contribute to increased yield; concentrations decreased by more than 30% gave less than full black shades on polyester fibers.

The major constituent of the black disperse dye mix of this invention is the disazo navy blue dye; substitution of known anthraquinone or monoazo blue disperse dyes for the disazo blue dye is deleterious, as evidenced by the following substitution of anthraquinone dyes, e.g., C.I. Disperse Blue 109, gave black dyeings which heavily stained nylon when washed after durable-press finishing. Moreover, fastness to rubbing was poor, both with and without durable press treatment. Substitution of monoazo dyes, e.g., C.I. Disperse Blue 79, gave black dyeings with poorer ozone fastness than obtained with the selected disazo blue disperse dyes of this invention.

The composition of the minor compnent, the yellow-brown monoazo disperse disperse dye, is also critical to obtain jet black dyeings with good fastness. The critical dye structural feature may be illustrated with the following formula:

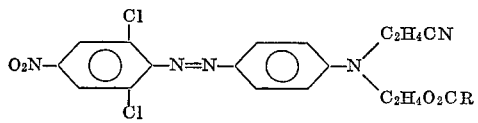

When the polyester component was dyed black with a mix consisting of a prior art dye, R=alkyl, the resulting dyeings were distinctly inferior for fastness to perspiration after durable-press and to sublimation fastness with or without durable-press, as compared to the formula of this invention, i.e., when R=aryl.

A greener black shade on the polyester component can also be prepared by adding for shading purposes to a disperse disazo blue and disperse monoazo yellow-brown formulation, a minor amount of disperse, greenish yellow dyes represented by structure as C.I. Disperse Yellow 42, C.I. 10338, or as C.I. Disperse Yellow 67.

A greener black was obtained which showed fasteness properties comparable with selected anthraquinone shaded dyeings (Example 28) with the exception that alkaline perspiration stain was more pronounced but was satisfactory. In addition, a more yellowish bloom was observed on the pieces which were treated with durable-press than those shaded with selected anthraquinones.

EXAMPLE 24

A pad bath is prepared by diluting a paste which contains, in addition to customary amounts of conventional dispersing agents and fungicides, the following:

| Paste Formula | Parts pure component per 100 parts of paste |
|---|---|
| $O_2N-\langle\bigcirc\rangle(Cl)-N=N-\langle\bigcirc\rangle(OCH_3)(CH_3O)-N=N-\langle\bigcirc\rangle(NHSO_2CH_3)-N(C_2H_4O_2CCH_3)_2$ | 14.2 |
| $O_2N-\langle\bigcirc\rangle(Cl)(Cl)-N=N-\langle\bigcirc\rangle-N(C_2H_4CN)(C_2H_4O_2CC_6H_5)$ | 6.8 |

For each liter of pad bath, 120 grams of the above paste is diluted in a bath which contains:

Pad bath formula
120 grams above paste formula
20.0 g./l. super clean (a refined solution of natural gums used to control migration of pigment during drying) (optional)
0.5 g./l. surface active agent (optional)
as a sodium alkyl aryl sulfonate.

Pad bath is padded on "Dacron"/cotton poplin fabric (65% by weight of "Dacron" and 35% by weight of cotton) with a pickup of 65% followed by drying (infrared predrying is desirable) to remove the water.

Depending on the type of padder used, the pickup value can be as low as 50% in which case the dye (paste) concentration is increased to $$120 \times \frac{65}{50}$$

or approximately 160 grams of paste per liter of padding bath. Pickup can exceed 65% in which case the concentration of dye should be adjusted accordingly.

Thermosoling, in which the "Dacron" component is dyed with the disperse color, is accomplished by treating the dried pigment-padded fabric for 60 to 120 seconds at temperatures ranging from 400° to 430° F.

The fabric, after thermosoling, is then padded with a bath containing

| | G./l. |
|---|---|
| Sodium hydroxide | 20–50 |
| Sodium hydrosulfite at 80°–100° F. | 20–40 | followed by steaming at 212–200° F. for 20–60 seconds to simulate vat dye application to the cotton. The fabric is then rinsed, soaped, rinsed and dried. A pleasing two-toned fabric results in which the "Dacron" component is dyed a jet black and the cotton remains, in contrast, white. The resulting dyeing is fast to light, washing, rubbing, gas fumes, ozone fumes, drycleaning fluids, both acid and alkaline perspiration and shows negligible staining of white "Dacron" fabric when subjected to standard sublimation tests.

The above fabric may then be further treated to impart durable press properties. The durable press finish is obtained by padding with a bath containing

| | G./l. |
|---|---|
| Permafresh 183 | 200.0 |
| Triton X–100 | 2.5 |
| Mykon SF | 22.5 |
| Rhoplex HA–8 | 22.5 |
| Silkand 40 | 30.0 |
| Catalyst X–4 | 36.0 |

(all heretofore defined).

The resin-impregnated fabric is then dried to remove the water content. The fabric is then cured for about 15 minutes at 325° F. (Curing, in the trade, is done on the finished garment with the use of special frames and ovens.)

Compared with the non-resin treated sample above, the dyeing with durable-press is noticeable to considerably stronger in appearance and shows far greater resilience and resistance to creasing. This black and white dyeing, with durable press, shows very good fastness to all of the tests conducted on the non-resinated material.

EXAMPLE 25

A dyeing is prepared as in Example 24 except that after fixation by thermosoling, the dyeing is padded at 200° F. with a bath containing:

|  | G./l. |
|---|---|
| "Sulfogene" Carbon HCF liquid (C.I. Leuco Sulfur Black 1, Colour Index No. 53,185) | 120 |
| Sodium sulfide chips | 3 |
| Sodium carbonate | 1–2 | at a pick-up of 50–65%. The dyeing is then steamed for one minute then rinsed, oxidized in 3–4 g./l. of both sodium bichromate and acetic acid, rinsed, scoured lightly for 15–20 seconds in 2–3 g./l. of detergent, rinsed and dried. The fabric is a solid jet black; the polyester is dyed with the disperse black and the cotton with sulfur black. Part of the run is further resin treated as in Example 1 to produce a durable-press finish. Fastness to the tests, listed in Example 24, is fully satisfactory on both the resin and non-resinated goods.

EXAMPLE 26

A dyeing is prepared as in Example 24 and in addition, 250 g./l. of Ponsol Direct Black LA (identified only as C.I. Vat Black) double paste is added to the color bath containing the disperse black. After Thermosoling, the dyeing is chemically padded with 45 g./l. of both sodium hydrosulfite and sodium hydroxide followed by steaming for 30 seconds. The dyeing is then rinsed, oxidized in 3–4 g./l. of both hydrogen peroxide and acetic acid, rinsed, soaped, rinsed and dried. Like the dyeing obtained in Example 25, the resulting shade was a rich, full black. Fastness properties of this Example 26 exceeded Example 25 in that this example was superior in fastness when washed in the presence of chlorine. This dyeing, in which the disperse black dyed the polyester and the vat black colored the cotton, showed good fastness properties to tests discussed in Example 24 with or without durable press finish.

EXAMPLE 27

Runs were made as in Examples 24, 25 and 26 except that a heavy twill composed of 50% polyester and 50% cotton was used in place of the 65% "Dacron"-35% cotton blend. All processing was the same except the concentration of the disperse dye was multiplied by $50/_{65}$ to compensate for the lesser amount of polyester in the twill blend. The same excellent results observed in Examples 24, 25 and 26 were noted.

EXAMPLE 28

A greener shade of black was produced as in Examples 24, 25 and 26 by including in the formula of Example 24, 1.0 part of

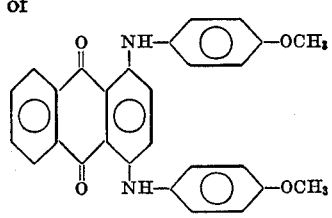

per 100 parts of dye paste for shading purposes. A greener black was obtained which showed the same fastness properties as disclosed in Examples 24, 25 and 26. Dyeings made with concentrations of the above anthraquinone dye exceeding 2.0 parts per 100 parts of paste proved wasteful as the best blacks were obtained with the maximum concentration as disclosed above or with less. Where a good reddish-toned black is desired, the anthraquinone dye may be omitted.

The following compound

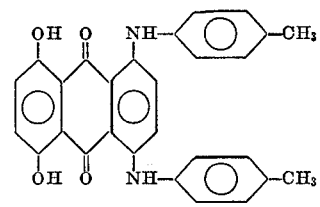

may be used as the shading anthraquinone dye.

EXAMPLE 29

Dyeings were made as in Examples 24, 25 and 26 and 28 with the exception that the tinctorial ingredients of the paste formula given in Examples 24 and 28 were increased by 30% in one set and decreased by 30% in another. It was found that formulas which were increased by more than 30% were wasteful and did not contribute to additional yield. Formulas of disperse pastes which were decreased by more than 30% were less than good full blacks. Fastness properties varied little over the ±30% range.

EXAMPLE 30

Dyeings were made as in Examples 24, 25 and 26 with the exception that the disperse dye paste contained 12 parts of C.I. Disperse Blue 109 per 100 parts of paste in place of the disazo navy-blue disperse dye. The resulting dyeings showed very heavy staining properties of nylon when washed after durable-press finish. Fastness to rubbing was poor with or without durable press. Consequently this black was not satisfactory. Another anthraquinone blue

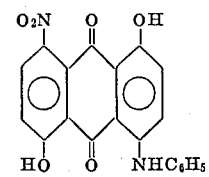

was substituted at an equal amount in place of the disazo navy-blue disperse dye; like C.I. Disperse Blue 109 it produced dyeings which were poor to rubbing and showed heavy nylon stain with washing after durable-press finish.

EXAMPLE 31

Dyeings were made as in Example 24 with the exception that 14.2 parts of a dye, having the structure

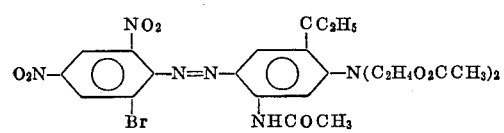

per 100 parts of paste was substituted in place of the disazo navy-blue disperse dye. The dyeings which were treated with durable-press showed less fastness to A.A.T.C.C. 3 cycles of ozone test than the corresponding dyeing of Example 24 based on the disazo navy-blue disperse dye. Thus, a black based on selected disazo compounds has shown merit over anthraquinone based blues (Example 30) and a monoazo type.

EXAMPLE 32

Dyeings were made as in Examples 24–26 in which the disazo navy-blue disperse dye was replaced with an equal weight of the following dyes:

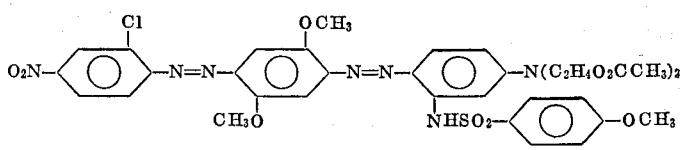

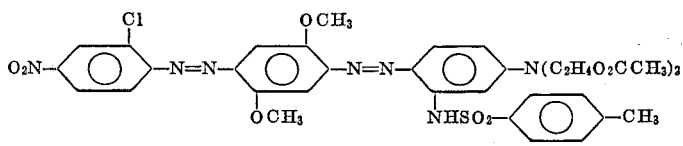

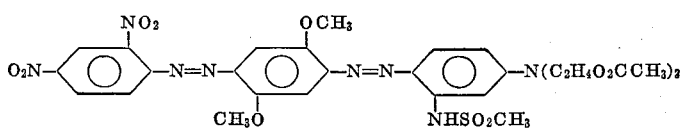

Dyeings were obtained which showed good fastness results particularly after durable-press finish.

EXAMPLE 33

Dyeings can be made as in Examples 24–26 in which the disazo navy-blue disperse dye may be replaced with an equal weight of:

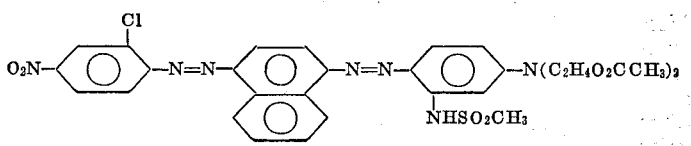

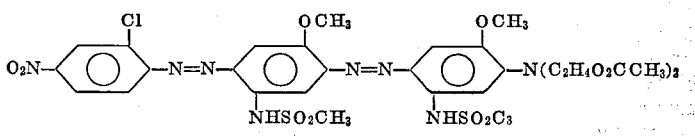

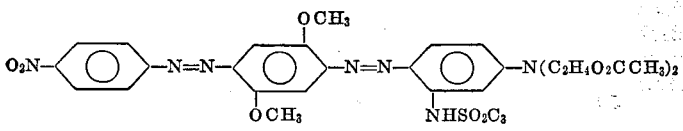

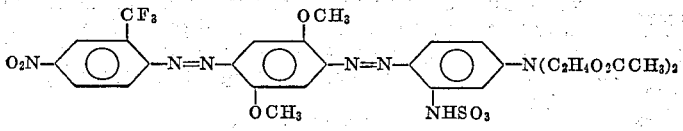

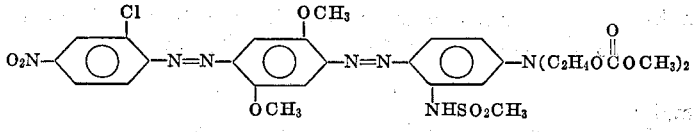

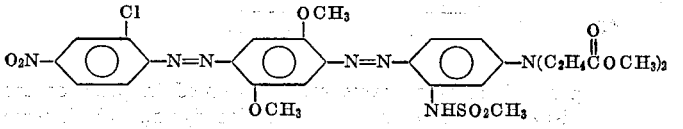

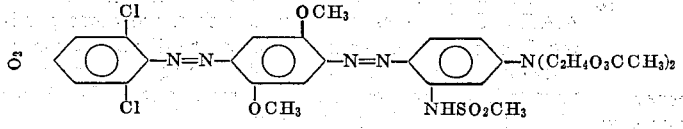

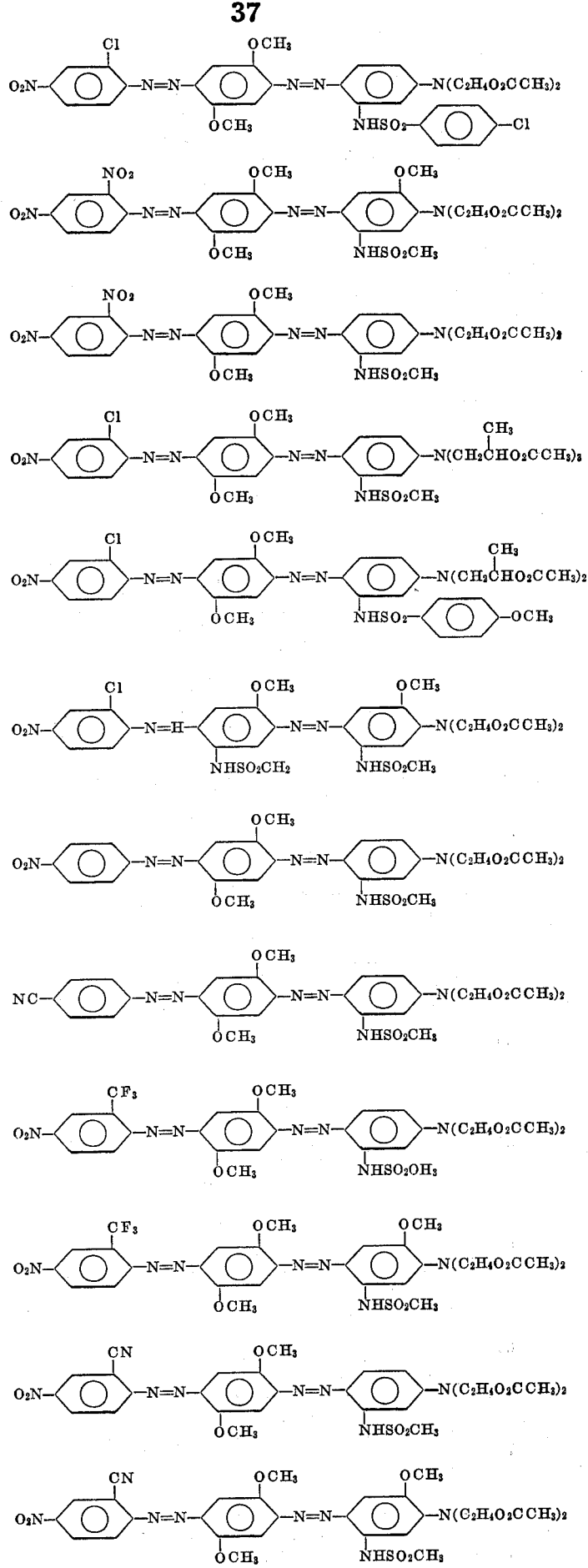

Dyeings may be obtained which show good fastness results particularly after durable-press finish.

EXAMPLE 34

Dyeings were made as in Examples 24, 25 and 26 in which the disazo navy blue disperse dye was replaced with an equal weight of:

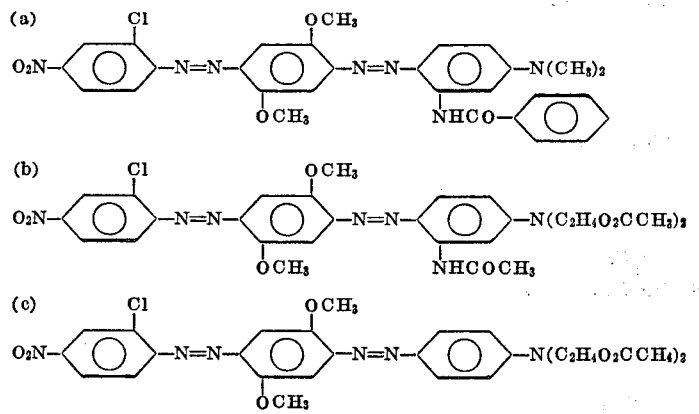

These blacks proved to be unsatisfactory because of heavy nylon stain with washing before and after durable-press. Fastness to rubbing, without durable-press, was poor.

EXAMPLE 35

Dyeings were made as in Examples 24, 25 and 26 in which the monoazo yellow-brown disperse dye was replaced with an equal weight of a dye believed to have the structure:

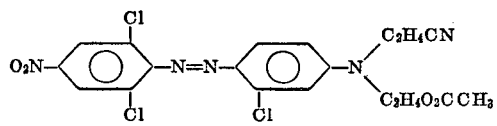

The resulting dyeings were distinctly inferior for fastness to perspiration after durable-press and to sublimation fastness with or without durable-press.

EXAMPLE 36

A greener shade of black was produced as in Examples 24, 25 and 26 by including in the formula of No. 24, 4.0 parts of C.I. Disperse Yellow 42, C.I. 10,338 per 100 parts of dye paste for shading purposes. A greener black was obtained which showed fastness properties comparable with the shaded dyeings of Example 28 with the exception that alkaline perspiration stain was more pronounced but was satisfactory. In addition, a more yellowish bloom was observed on the pieces which were treated with durable-press than those in Example 28. The dyeings of this Example 36 were fully satisfactory but the dyeings of Example 28 were superior.

EXAMPLE 37

A greener shade of black was produced as in Examples 24, 25 and 26 by including in the formula of No. 1, 2.0 parts of C.I. Disperse Yellow 67, per 100 parts of dye paste for shading purposes. A greener black was obtained which showed fastness properties comparable with the shaded dyeings of Example 28 with the exception that alkaline perspiration stain was more pronounced but was satisfactory. In addition, a more yellowish bloom was observed on the pieces which were treated with durable-press than those in Example 28. The dyeings of this Example 37 were fully satisfactory but the dyeings of Example 28 were superior.

EXAMPLE 38

Dyeings were made as in Example 25 in which the monoazo yellow disperse dye was replaced with the following dyes:

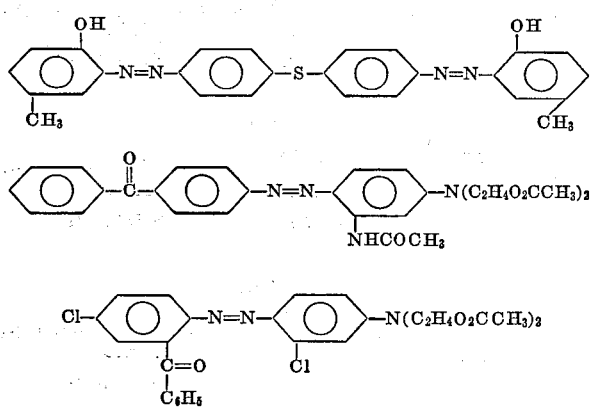

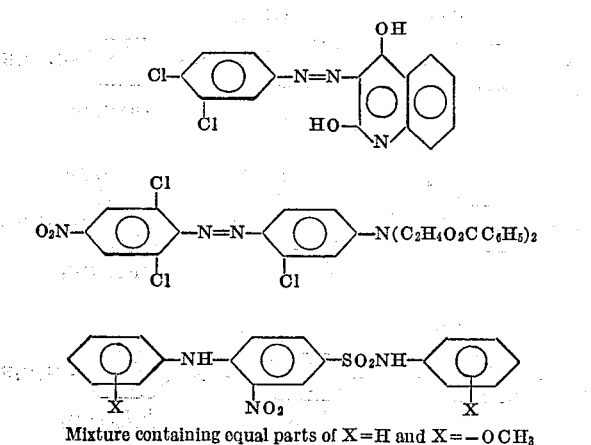

Mixture containing equal parts of X=H and X=—OCH₃

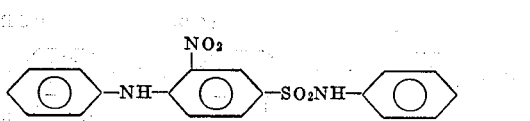

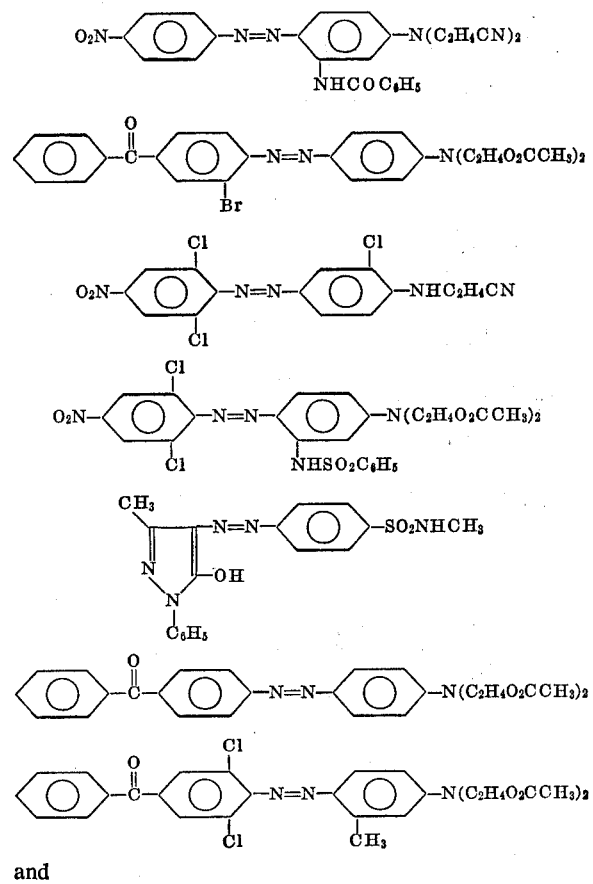

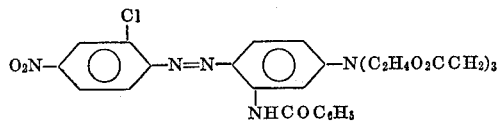

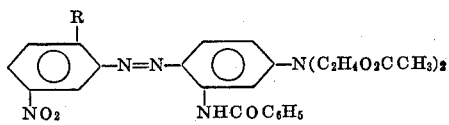

and

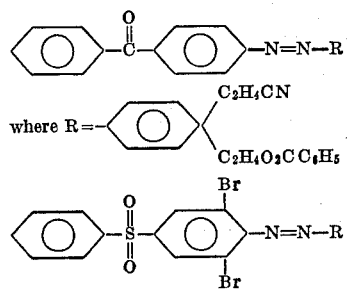

Dyeings were obtained which showed good fastness results particularly after durable-press finish. The last dye gave a reddish-black shade.

EXAMPLE 39

Dyeings can be made as in Example 25 in which the monoazo yellow disperse dye may be replaced by dyes of the following structures:

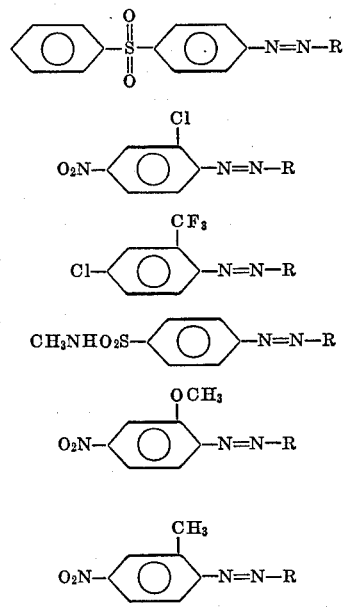

where R may be —NO₂ or —OCH₃.

The dyeings will show good fastness results particularly after durable-press finish.

EXAMPLE 40

Dyeings were made as in Example 25 in which the monoazo yellow disperse dye was replaced with the following dyes:

Dyeings were obtained which showed good fastness results particularly after durable-press finish.

EXAMPLE 41

(A) A dye bath is prepared which contains 10 parts of paste (see Example 24), 1 part of an anionic surfactant (a sodium hydrocarbon sulfonate), 10 parts of Cindye DAC–888 (an emulsifiable form of butyl benzoate), 1200 parts of water and sufficient acetic acid to fix pH at 5–6.0. This dye liquor is placed in a conventional package dyeing machine which contains 100 parts of "Dacron" 54 yarn which is wound on a perforated spindle. The dye liquor is forced through the yarn package in either direction, from the inside to outside or vice versa. The machine is equipped with means for periodically reversing the flow of dye liquor through the yarn, thus insuring good penetration and level dyeing. The machine operates as a closed system and is built to withstand internal pressure. The dye bath is heated from ambient temperature to 270° F. in 15–30 minutes and is maintained at 270° F. for one hour. The bath is then dropped and the package is cleaned by rinsing, soaping, and rinsing and drying. A good jet black dyeing is obtained which is fast to rubbing, light and washing.

This black yarn is woven into a fabric which is then sensitized with resin and later given a durable-press finish when fashioned into a garment by curing.

This garment shows very good fastness to washing, light, perspiration, ozone and gas fumes.

(B) Same, except dyeing temperature was 300° F. Same good results were obtained.

(C) Same, but dyeing temperature was 250° F. Satisfactory, but poorer results were obtained. Package showed less fastness to rubbing.

(D) Same, but dye was decreased to 7 parts. A weaker, but still satisfactory black was obtained. Below 7 parts of paste, dyeings were too weak. Increasing dye concentration to above 13 parts proved to be wasteful.

In the following described disperse dye formulations for achieving desired black shades, including useful somber shades, the disazo blue and monoazo yellow dye components may be varied by plus or minus 50%. Insofar as the optional anthraquinone green component is concerned, said component may be increased in concentration up to about 50% of the preferred formulation.

Useful somber shades are obtained within the following limits for the preferred formulation.

| Disperse dye: | Parts pure component per 100 parts of paste |
|---|---|
| Disazo blue | 7.1–21.3 |
| Monoazo yellow brown | 3.4–10.2 |
| Anthraquinone green | 0–2 |

The novel dyes and dye mixtures of this invention may be formulated into pastes or powders to facilitate commercial use.

More specifically, the novel blue disperse dye may be formulated in a paste as follows; all parts are by weight:

| Blue disperse dye | 17.41 |
|---|---|
| "Polyfon" O | 15.68 |
| Sorbitol | 6.05 |
| "Nalco" 71-D-5 | .10 |
| "Dowicide" G | .10 |
| Sodium silicofluoride | .10 |
| Paraformaldehyde | .10 |
| Water | 60.46 |

When prepared in a black paste, a preferred formulation is as follows:

| Blue dye | 14.20 |
|---|---|
| Yellow dye | 6.86 |
| Anthraquinone dye | 1.37 |
| "Polyfon" O | 18.29 |
| Sorbitol | 10.00 |
| "Nalco" 71-D-5 | .10 |
| "Dowicide" G | .10 |
| Sodium silicofluoride | .10 |
| Paraformaldehyde | .10 |
| Water | 48.88 |

In the preceding paste formulations, "Polyfon" O, a sodium lignosulfonate, is an anionic dispersant. Sorbitol is a humectant and is added to prevent the pastes from drying out. "Nalco" 71-D-5 is an anti-foam agent. "Dowicide" G, sodium silicofluoride and paraformaldehyde are added to inhibit bacteria growth in the pastes.

The novel dyes of this invention, including black mix, also have utility in the printing field. The blue paste herein described requires Thermosoling for development, with or without a carrier.

When cottage steamed under normal pressure conditions, the pressure being raised to 24 p.s.i.g., development approaching the Thermosol treatment is obtained. When printed on acetate and "Arnel" triacetate by conventional procedure, printing is effected. When Thermosoled on cotton, printing is achieved and resulting stain is substantially removed by giving the resulting print a vat flash age treatment in caustic and hydro. Similar printing results are obtained when utilizing the black mix embodiment of this invention.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof.

The embodiments of this invention in which an exclusive property or privilege is claimed are as follows:

1. Disazo dyes of the structure:

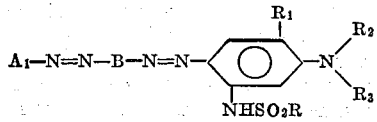

wherein:
A₁=phenyl or phenyl substituted with up to three substituents selected from the group consisting of nitro, chlorine, bromine, cyano, lower alkyl, lower alkoxy, trifluoromethyl, alkylsulfonyl of 1–4 carbon atoms, acetyl, N-alkyl carboxamido wherein the alkyl moiety has 1–4 carbon atoms, and carbalkoxy wherein the alkoxyl moiety has 1–4 carbon atoms;

B is selected from the group consisting of (1) 1,4-naphthylene and (2) from a 1,4-phenylene group of the following structure:

wherein
R₆ is H, lower alkyl or lower alkoxy;
R₅ is H, lower alkyl, lower alkoxy, chlorine, bromine, or methanesulfonamido;
R is alkly having 1–4 carbon atoms or

where M is lower alkyl, lower alkoxy, chlorine, or bromine;
R₁ is H, lower alkyl or lower alkoxy;
R₂ is —A—O—Q—R₄ or

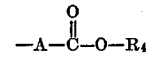

wherein
A is alkylene having 1–4 carbon atoms,
Q is

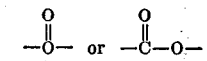

R₄ is alkyl of 1–4 carbon atoms; and
R₃ is cyanoethyl, alkoxy alkyl wherein each alkoxy and alkyl moiety has 1–4 carbon atoms, —A—O—Q—R₄ or

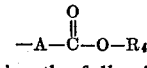

2. Disazo dyes having the following structure:

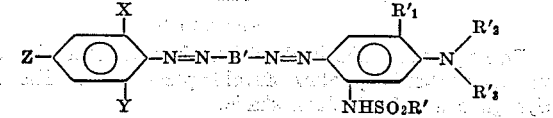

wherein:
X, Y and Z are substituents selected from the group consisting of hydrogen, nitro, chloro, bromo, cyano, and trifluoro methyl;
B' is chosen from

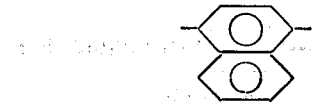

or

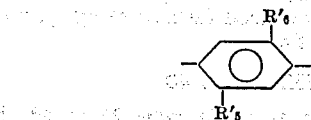

wherein R'₅ and R'₆ are selected from the group consisting of hydrogen, lower alkyl and lower alkoxy;
R' is selected from the group consisting of lower alkyl and

wherein M' is lower alkyl, lower alkoxy, or chlorine;
R'₁ is hydrogen or lower alkoxy;
R'₂ and R'₃ are

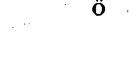

wherein A' is an alkylene group of 2-3 carbon atoms and $R_4$ is alkyl of 1-4 carbon atoms.
3. The disazo dye
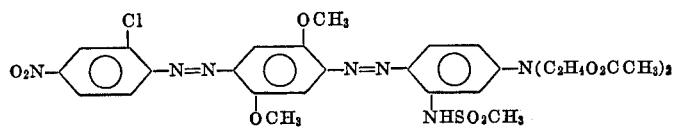
4. The disazo dye
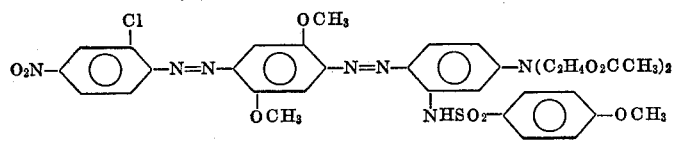
5. The disazo dye
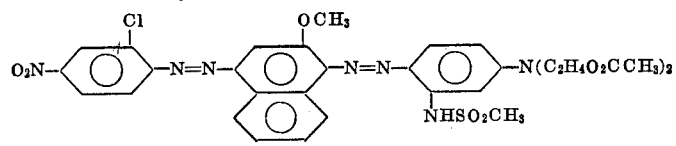
6. The disazo dye
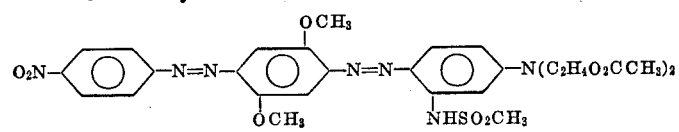
7. The disazo dye
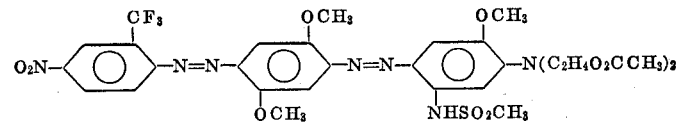
8. The disazo dye
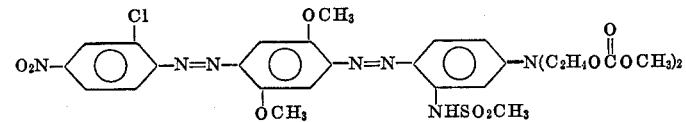
9. The disazo dye
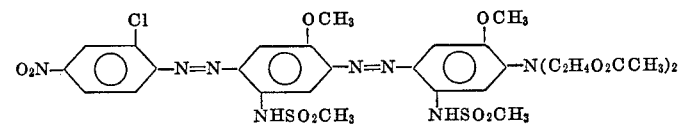
References Cited
UNITED STATES PATENTS
| | | | |
|---|---|---|---|
| 2,289,413 | 7/1942 | Ellis et al. | |
| 2,373,700 | 4/1945 | McNally et al. | 260—187 XR |
| 3,222,355 | 12/1965 | Gaetani | 260—186 |
| 3,310,550 | 3/1967 | Liechti | 260—186 XR |
| 3,331,829 | 7/1967 | Jirou et al. | 260—187 XR |
| 3,338,880 | 8/1967 | Favre et al. | 260—187 XR |
| 3,359,255 | 12/1967 | Liechti | 260—187 XR |
FLOYD D. HIGEL, Primary Examiner
U.S. Cl. X.R.
260—186, 191, 206, 575, 196, 465, 380, 378, 207.1, 155; 8—41, 50, 27, 24

PO-1050
(5/63)

UNITED STATES PATENT OFFICE
CERTIFICATE OF CORRECTION

Patent No. 3,523,936    Dated August 20, 1970

Inventor(s) Masuo Toji

It is certified that error appears in the above-identified patent and that said Letters Patent are hereby corrected as shown below:

Column 45, Claim 5, delete " $-OCH_3$ ".

SIGNED AND
SEALED
OCT 20 1970

(SEAL)
Attest:

Edward M. Fletcher, Jr.
Attesting Officer

WILLIAM E. SCHUYLER, JR.
Commissioner of Patents